(12) United States Patent
Nakamura et al.

(10) Patent No.: US 9,008,963 B2
(45) Date of Patent: Apr. 14, 2015

(54) MAP INFORMATION DISTRIBUTION SYSTEMS AND METHODS

(75) Inventors: Norihiro Nakamura, Toyokawa (JP); Yoriyuki Nagata, Okazaki (JP); Hironobu Sugimoto, Toyota (JP); Tomoki Kodan, Nagoya (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 534 days.

(21) Appl. No.: 12/224,323

(22) PCT Filed: Jul. 9, 2007

(86) PCT No.: PCT/JP2007/064042
§ 371 (c)(1),
(2), (4) Date: Nov. 20, 2008

(87) PCT Pub. No.: WO2008/007794
PCT Pub. Date: Jan. 17, 2008

(65) Prior Publication Data
US 2010/0017108 A1    Jan. 21, 2010

(30) Foreign Application Priority Data

Jul. 10, 2006 (JP) ................................ 2006-189614
Jul. 10, 2006 (JP) ................................ 2006-189616

(51) Int. Cl.
*G01C 21/00* (2006.01)
*G01C 21/32* (2006.01)
(Continued)

(52) U.S. Cl.
CPC .......... *G01C 21/32* (2013.01); *G06F 17/30241* (2013.01); *G08G 1/096827* (2013.01); *G08G 1/096866* (2013.01); *G09B 29/10* (2013.01)

(58) Field of Classification Search
USPC ........................ 726/7; 701/207, 208, 450–453
See application file for complete search history.

(56) References Cited

U.S. PATENT DOCUMENTS 6,125,323 A * 9/2000 Nimura et al. ................ 701/207
7,428,460 B2 * 9/2008 Atarashi et al. .............. 701/532
(Continued)

FOREIGN PATENT DOCUMENTS

JP     A-2004-108834     4/2004
JP     A-2004-125510     4/2004
(Continued)

OTHER PUBLICATIONS

Oct. 14, 2010 Canadian Office Action issued in Application No. 2,645,219.
(Continued)

*Primary Examiner* — Elaine Gort
*Assistant Examiner* — Edward Winston, III
(74) *Attorney, Agent, or Firm* — Oliff PLC

(57) ABSTRACT

Map information distribution systems and methods store map information and version information for each road category of the map information stored in a navigation device, the version information correlated with identification information identifying the navigation device. The systems and methods receive the identification information from the navigation device and obtain, based on the received identification information, the version information for each road category of the map information stored in the navigation device corresponding to the stored identification information. The systems and methods extract, based on the obtained version information for each road category, differential data for each road category with stored map information of a latest version, and transmit the extracted differential data for each road category to the navigation device corresponding to the received identification information.

18 Claims, 14 Drawing Sheets

(51) Int. Cl.
*G06F 17/30* (2006.01)
*G08G 1/0968* (2006.01)
*G09B 29/10* (2006.01)

(56) References Cited

U.S. PATENT DOCUMENTS

| | | | |
|---|---|---|---|
| 7,577,520 B2 * | 8/2009 | Nomura | 701/208 |
| 7,930,099 B2 * | 4/2011 | Iwahori | 701/450 |
| 2002/0174360 A1 * | 11/2002 | Ikeda | 713/200 |
| 2004/0085227 A1 * | 5/2004 | Mikuriya et al. | 340/995.14 |
| 2005/0049784 A1 | 3/2005 | Ikeuchi et al. | |

FOREIGN PATENT DOCUMENTS

| | | |
|---|---|---|
| JP | A-2004-126035 | 4/2004 |
| JP | A-2006-065246 | 3/2006 |

OTHER PUBLICATIONS

Japanese Patent Office, Notification of Reason(s) for Refusal mailed May 18, 2010 in Japanese Patent Application No. 2006-189616 w/Partial English-language Translation.

\* cited by examiner

FIG. 2
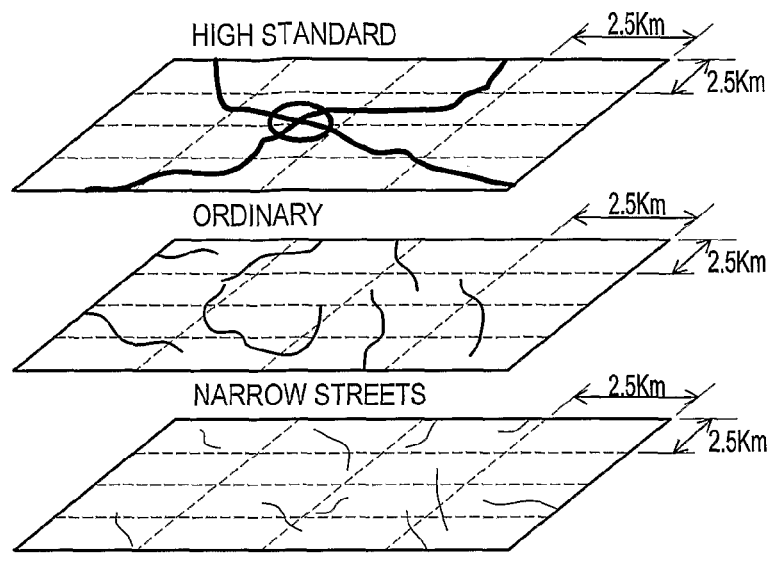
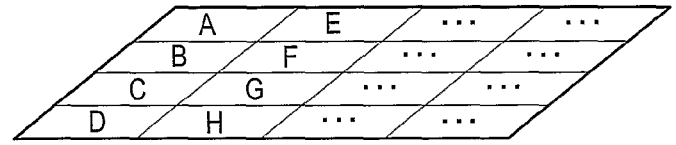
BLOCK NUMBER
51
| NAVIGATION ID | DISTRIBUTION ROAD CATEGORY | BLOCK ID | VERSION |
|---|---|---|---|
| 1001 | HIGH STANDARD | A | 1 |
|  | HIGH STANDARD | B | 1 |
|  | HIGH STANDARD | C | 1 |
|  | HIGH STANDARD | D | 2 |
|  | ⋮ | ⋮ | ⋮ |
|  | ORDINARY | A | 2 |
|  | ORDINARY | B | 1 |
|  | ⋮ | ⋮ | ⋮ |
|  | NARROW STREET | A | 1 |
|  | NARROW STREET | B | 2 |
|  | ⋮ | ⋮ | ⋮ |
| 1002 | ⋮ | ⋮ | ⋮ |
| ⋮ | ⋮ | ⋮ | ⋮ |

| VERSION | BLOCK ID | DISTRIBUTION ROAD CATEGORY | DIFFERENTAIL DATA FILE NAME |
|---|---|---|---|
| 2 | A | HIGH STANDARD | 2A1 |
| 2 | A | ORDINARY | 2A2 |
| 2 | B | HIGH STANDARD | 2B1 |
| 2 | B | ORDINARY | 2B2 |
| 2 | B | NARROW STREET | 2B3 |
| 2 | C | HIGH STANDARD | 2C1 |
| 2 | C | ORDINARY | 2C2 |
| 2 | C | NARROW STREET | 2C3 |
| 2 | D | HIGH STANDARD | 2D1 |
| 2 | E | NARROW STREET | 2E1 |
| 2 | F | HIGH STANDARD | 2F1 |
| ⋮ | ⋮ | ⋮ | ⋮ |

| NAVIGATION ID | DISTRIBUTION ROAD CATEGORY | BLOCK ID | VERSION |
|---|---|---|---|
| 1001 | HIGH STANDARD | A | 1 |
| | ORDINARY | A | 2 |
| | NARROW STREET | A | 1 |
| | HIGH STANDARD | B | 1 |
| | ORDINARY | B | 1 |
| | NARROW STREET | B | 2 |
| | HIGH STANDARD | C | 1 |
| | ORDINARY | C | 1 |
| | NARROW STREET | C | 1 |
| | HIGH STANDARD | D | 2 |
| | ORDINARY | D | 1 |
| | NARROW STREET | D | 1 |
| | HIGH STANDARD | E | 1 |
| | ORDINARY | E | 1 |
| | NARROW STREET | E | 1 |
| | ⋮ | ⋮ | ⋮ |
| 1002 | ⋮ | ⋮ | ⋮ |
| ⋮ | ⋮ | ⋮ | ⋮ |

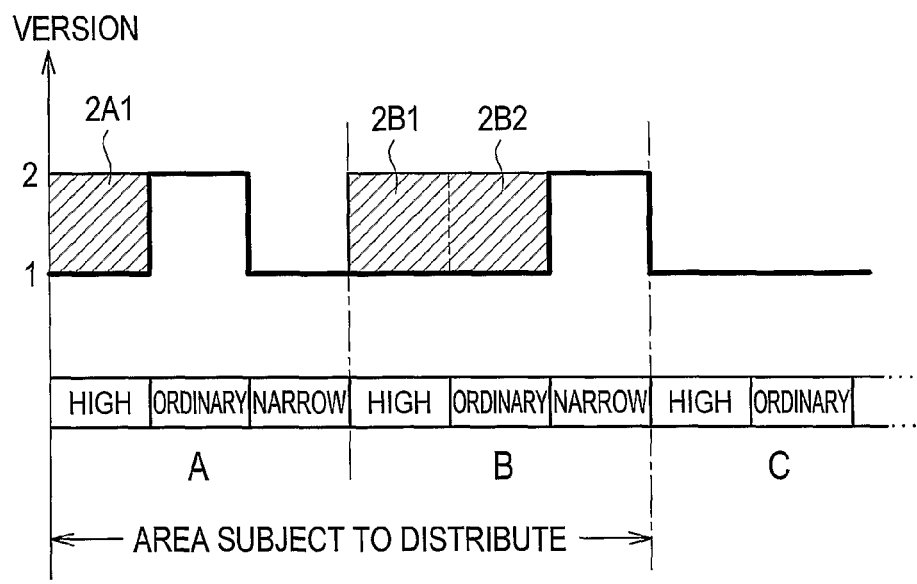

FIG. 9

| NAVIGATION ID | DISTRIBUTION ROAD CATEGORY | BLOCK ID | VERSION |
|---|---|---|---|
| 1001 | HIGH STANDARD | A | [2] |
| | ORDINARY | A | 2 |
| | NARROW STREET | A | 1 |
| | HIGH STANDARD | B | [2] |
| | ORDINARY | B | [2] |
| | NARROW STREET | B | 2 |
| | HIGH STANDARD | C | 1 |
| | ORDINARY | C | 1 |
| | NARROW STREET | C | 1 |
| | HIGH STANDARD | D | 2 |
| | ORDINARY | D | 1 |
| | NARROW STREET | D | 1 |
| | HIGH STANDARD | E | 1 |
| | ORDINARY | E | 1 |
| | NARROW STREET | E | 1 |
| | ⋮ | ⋮ | ⋮ |
| 1002 | ⋮ | ⋮ | ⋮ |
| ⋮ | ⋮ | ⋮ | ⋮ |

| NAVIGATION ID | BLOCK ID | DISTRIBUTION ROAD CATEGORY | VERSION |
|---|---|---|---|
| P00001 | A | HIGH STANDARD | 2 |
| | A | ORDINARY | 2 |
| | B | HIGH STANDARD | 2 |
| | B | ORDINARY | 2 |
| | B | NARROW STREET | 2 |
| | C | HIGH STANDARD | 2 |
| | C | ORDINARY | 2 |
| | C | NARROW STREET | 2 |
| | D | HIGH STANDARD | 2 |
| | E | NARROW STREET | 2 |
| P00002 | F | HIGH STANDARD | 2 |
| | G | ORDINARY | 2 |
| ⋮ | ⋮ | ⋮ | ⋮ |

FIG. 15

| NAVIGATION ID | DISTRIBUTION ROAD CATEGORY | BLOCK ID | VERSION |
|---|---|---|---|
| 1001 | HIGH STANDARD | A | [2] |
| | ORDINARY | A | 2 |
| | NARROW STREET | A | 1 |
| | HIGH STANDARD | B | [2] |
| | ORDINARY | B | [2] |
| | NARROW STREET | B | 2 |
| | HIGH STANDARD | C | [2] |
| | ORDINARY | C | [2] |
| | NARROW STREET | C | [2] |
| | HIGH STANDARD | D | 2 |
| | ORDINARY | D | 1 |
| | NARROW STREET | D | 1 |
| | HIGH STANDARD | E | 1 |
| | ORDINARY | E | 1 |
| | NARROW STREET | E | [2] |
| ⋮ | ⋮ | ⋮ | ⋮ |
| 1002 | ⋮ | ⋮ | ⋮ |
| ⋮ | ⋮ | ⋮ | ⋮ |

63

MAP INFORMATION DISTRIBUTION SYSTEMS AND METHODS

INCORPORATION BY REFERENCE

This application is a National Phase of PCT/JP2007/064042, filed Jul. 9, 2007, which claims priority of Japanese Patent Application No. 2006-189616, filed Jul. 10, 2006, and Japanese Patent Application No. 2006-189614, filed Jul. 10, 2006. The disclosures of each of the prior applications, including the specifications, drawings, and abstracts are incorporated herein by reference in their entirety.

BACKGROUND

1. Related Technical Fields

Related technical fields include map information distribution systems and centers. Specifically, related technical fields include map information distribution systems and centers that distribute updating information for updating map information to a navigation device.

2. Related Art

In recent years, more vehicles have been equipped with a navigation device that provides driving guidance to a driver to reach the desired destination easily. Such devices detect the current vehicle position by a GPS receiver and such, obtain map data corresponding to the current position from recording media such as DVD-ROM and HDD or via a network, and display the map data on a liquid crystal monitor. The navigation device makes it possible to understand where the vehicle is currently driving at a glance by displaying a map image of a neighboring area of the current vehicle position based on the map data on a display, as well as displaying a vehicle position mark superimposed on the map image and scrolling the map image according to the movement of the vehicle or moving the vehicle position mark while fixing the map image on the screen.

Every year, new roads (newly constructed roads) are constructed. With the construction of new roads, existing roads may be removed or the configuration of existing roads may be modified. Therefore, the map data stored in a navigation device needs to be updated at some interval. Updating map data is done by, for example, replacing an old DVD with a new DVD, loading updated map information into the hard disk at shops, or renewing the content of the hard disk based on map data distributed from a map information distribution center, etc.

Various map information distribution centers which automatically distribute the updating information for updating map data stored in a navigation device to the aforementioned navigation device have been offered.

For example, when a navigation device requests differential data for updating map information from a map information distribution center, the navigation device transmits a navigation ID that identifies the navigation device and a mesh number for updating map information. The map information distribution center compares a version of map information of the mesh stored in the navigation device with that of the latest version based on the navigation ID and mesh number received and, when differential data is available, transmits the differential data to the navigation device. Such a map information distribution center is disclosed in Japanese Patent Application Publication No. JP-A-2004-125510 (see, e.g., paragraphs [0032]-[0040] and [0046]-[0063], and FIGS. 15-18 and 20-29.

SUMMARY

However, the map information distribution center described in Japanese Patent Application Publication No. JP-A-2004-125510 manages the version of map information stored in a navigation device of all roads regardless of road categories of high standard roads (such as national expressways, city expressways and national roads of single or double digit numbers), ordinary roads (such as national roads of triple digit numbers or more), principal local roads, prefectural roads and municipal roads, and narrow streets. For this reason, even while a part of the map information relating to national expressways, city expressways and national roads of single or double digit numbers have been updated to that of the latest version, when a navigation ID and a mesh number for updating map information are received from a navigation device, it is required to transmit the updating information for all roads, not extracting and transmitting the bare minimum amount of differential data to the navigation device. Thus, the amount of communication data between the map information distribution center and the navigation device becomes large.

Also, in the map information distribution system described in Japanese Patent Application Publication No. JP-A-2004-125510, the mesh number for updating map information is transmitted from the navigation device to the map information distribution center each time. Because the mesh number subject to update is transmitted every time, the amount of communication data by the navigation device and the map information distribution center becomes large. In addition, when the navigation device is updated based on the map information recorded on a storage medium, because the map information distribution center doesn't know the current version of map information stored in the navigation device, it is not able to extract the differential data of the bare minimum amount and to transmit the data to the navigation device.

Exemplary implementations of the broad principles described herein provide a map information distribution systems and methods which make it possible to reduce the amount of communication data with a navigation device. For example, because the map information distribution centers and methods manage the updating history of map information stored in the navigation device for each road category, it is possible to extract the bare minimum amount of differential data and transmit the data to the navigation device excluding the differential data relating to road categories which have been updated already.

Exemplary implementations provide systems and methods that store map information and version information for each road category of the map information stored in a navigation device, the version information correlated with identification information identifying the navigation device. The systems and methods receive the identification information from the navigation device and obtain, based on the received identification information, the version information for each road category of the map information stored in the navigation device corresponding to the stored identification information. The systems and methods extract, based on the obtained version information for each road category, differential data for each road category with stored map information of a latest version, and transmit the extracted differential data for each road category to the navigation device corresponding to the received identification information.

BRIEF DESCRIPTION OF THE DRAWINGS

Exemplary implementations will now be described with reference to the accompanying drawings, wherein:

FIG. 2 is an illustration describing an exemplary version management scheme of map data in a map information distribution center in the map information distribution system;

FIG. 7 is an illustration describing an example of extracted differential data of each mesh of the area subject to distribute;

FIG. 8 is a chart showing one example of distribution management information corresponding to each piece of the differential data of the area subject to distribute shown in FIG. 7;

FIG. 9 is a chart showing an example of the updated navigation updating history information shown in FIG. 6 based on the distribution management information shown in FIG. 8;

FIG. 11 is a chart showing an example of PC distribution management information stored in a distribution management information database in step 313 of the flowchart indicated in FIG. 10;

FIG. 15 is a chart showing an example of the updated navigation updating history information shown in FIG. 6 based on the PC distribution management information shown in FIG. 11 in step 413 of the flowchart indicated in FIG. 13.

DETAILED DESCRIPTION OF EXEMPLARY IMPLEMENTATIONS

The configuration of an exemplary map information distribution system 1 is described with reference to FIGS. 1 to 3.

Figure 1:
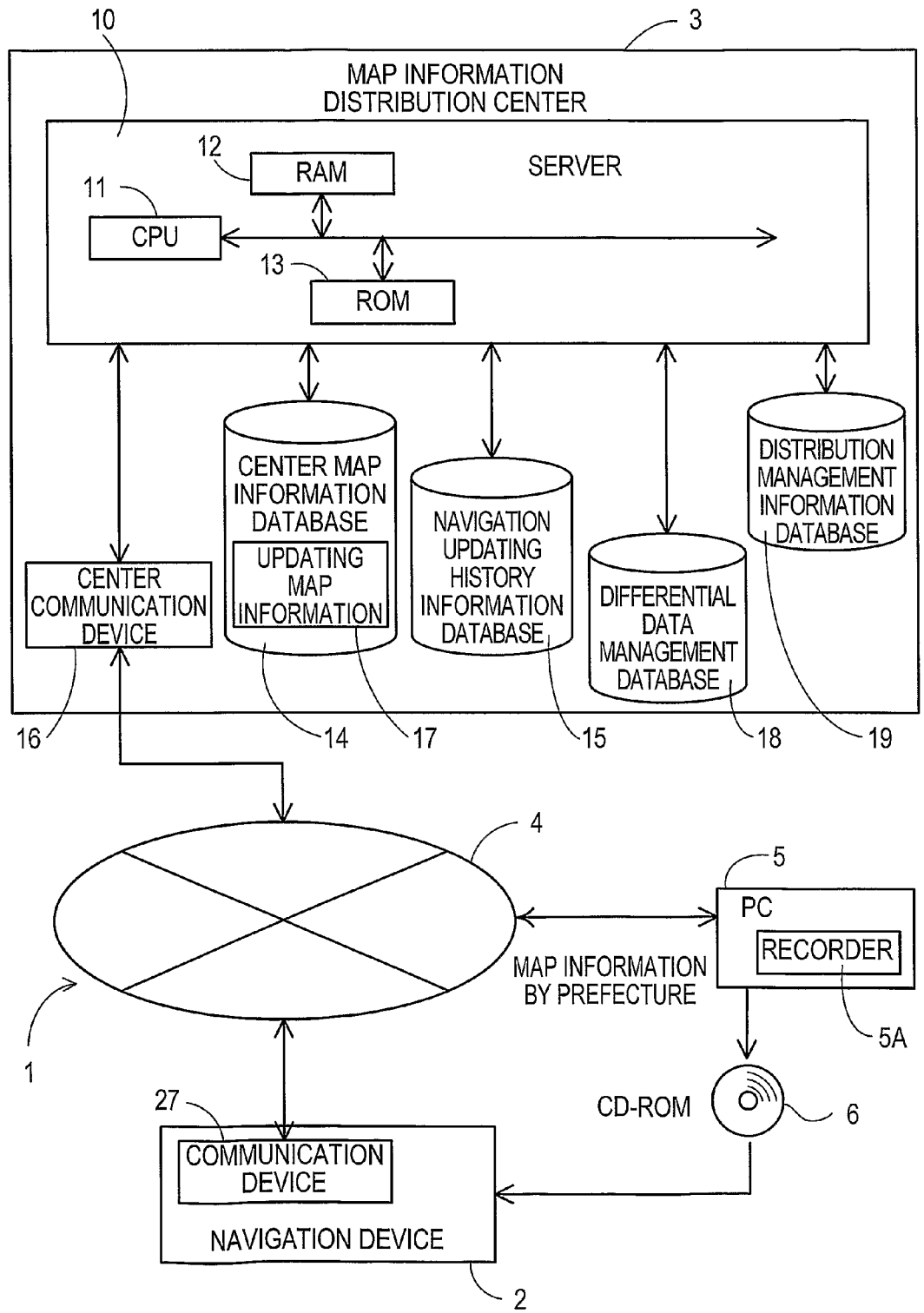
FIG. 1 is a block diagram of an exemplary map information distribution system.

As indicated in FIG. 1, the map information distribution system 1 is includes a navigation device 2, a map information distribution center 3 that distributes updating information for updating map information to the navigation device 2, a network 4, and a personal computer (PC) 5. The PC 5 can be connected to the network 4 and owned by a user, or a vendor of the navigation device 2. The navigation device 2, the map information distribution center 3, the PC 5, and the map information distribution center 3 are configured to send and receive various types of information respectively via the network 4. The configuration of navigation device 2 is described later in details referring to FIG. 3.

As indicated in FIG. 1, the map information distribution center 3 has a server 10, a center map information database 14 as a map information recording section that is connected to the server 10, a navigation updating history information database 15, a center communication device 16, a differential data management database 18, and a distribution management information database 19. The sever 10 has a controller (e.g., CPU 11) as an arithmetic device and a controller to control the whole server 10, a RAM 12 to be used as a working memory when the CPU 11 executes various arithmetic processes, and an internal storage such as a ROM 13 storing various control programs that may implement, for example, the later described method of navigation map information updating. Stored control programs extract updating information from the center map information database 14 for updating map information of the area subject to distribute to the map information of new version within the map information stored in the navigation device 2 according to a request from the navigation device 2, as well as distribute updating information with an addition of a distribution ID that identifies the updating information to the navigation device 2. An MPU and such may be used in place of the CPU 11.

The center map information database 14 stores updating map information 17, which is created by the map information distribution center 3, and is the base of map information when updating map information stored in the navigation device 2, sorted by version. Further, the center map information database 14 stores updating information (hereinafter called differential data) for updating a part (e.g., an area of 80 km square centered by the current vehicle position or a pre-registered home position) or a whole of map information currently stored in the navigation device 2 to the latest version stored in the updating map information 17, sorted by version. Here, a "version" refers to data specifying when map information is created.

The updating map information 17 stored in the center map information database 14 stores various types of information required for route guidance and map display of the navigation device 2 including, for example, map display data to display maps, intersection data relating to intersections, node data relating to node points, link data relating to roads (links) as one of facilities, search data to search routes, shop data relating to point of interest (POI) such as a shop as one of facilities, and spot search data to search spots.

The map display data is configured by units of 4 divided blocks (½ length), 16 divided blocks (¼ length) and 64 divided blocks (⅛ length) based on a 10 km×10 km block of a secondary mesh and the unit of each geographical area is set as to have approximately the same level of data amount. The smallest unit of 64 divided blocks is a size of an approximately 1.25 km square.

As for node data, the stored data includes the data relating to forks in actual roads (including intersections and T-shaped intersections), coordinates (position) of node points that are set to each road at predefined intervals according to a curvature radius and such, node attributes representing whether a node corresponds to an intersection or not, a connection link number list that is a list of link numbers of connecting links to nodes, an adjacent node number list that is a list of node numbers of adjacent nodes via links, and heights (altitudes) of each node point.

As for link data, the stored data includes the data relating to links that configure roads, for example, widths, gradients, cants, banks, surface conditions, number of lanes, places where any lane ends, places where any road narrows, and railroad crossing of the roads to that links attribute; the data relating to corners, for example, curvature radii, intersections, T-shaped intersections, and entrance and exit of corners; the data relating to road attributes such as downhills and uphills;

and the data relating to road categories such as toll roads including national expressways, city expressways, ordinary toll roads and toll bridges and ordinary roads including national roads, prefectural roads and narrow streets. Further, as for toll roads, the data stored includes access roads of entrance and exit of toll roads (ramps), and tollgates (interchanges).

As indicated in FIG. 2, differential data for each road category is managed in each block of an approximately 2.5 km square that is a divided into 16 (¼ length) 10 km×10 km area blocks of the secondary mesh above, divided in three distribution road categories of a high standard road category that includes national expressways, city expressways, freeways, ordinary toll roads, and national roads of single and double digit numbers, an ordinary road category that includes national roads of triple digit numbers or more, principal local roads, prefectural roads, and municipal roads, and a narrow street category that includes narrow streets, and stored in the updating map information 17 by versions.

Hereinafter, national expressways, city expressways, freeways, ordinary toll roads, and national roads of single and double digit numbers are referred to as high standard roads. National roads of triple digit numbers or more, principal local roads, prefectural roads, municipal roads are referred to as ordinary roads. Streets in downtown areas and such narrower than ordinary roads are referred to as narrow streets.

The differential data management database 18 is managed by setting a block ID (as A, B, C, D, E, F, G, H, and so on for 16 areas in FIG. 2) for each area of an approximately 2.5 km square in each version of the updating map information 17 (described later) and storing a differential data file name representing each piece of the differential data for each area sorted further by three distribution road categories of road standards (refer to FIG. 5).

As for search data, the stored data is used when searching and displaying routes to the set destination and include such data as cost data used to calculate search cost including cost of passing nodes (hereinafter called "node cost") and cost of links that configure roads (hereinafter called "link cost"), and route display data to display the route selected by route searching on a map displayed on the liquid crystal display 25.

As for shop data, the stored data includes the data relating to POI (Point(s) of Interest) such as hotels, hospitals, gas stations, parking lots and tourist facilities for each region together with their ID to identify the POI. The aforementioned center map information database 14 also stores audio output data to output the predefined data from a speaker 26 in the navigation device 2.

The navigation updating history information database 15 stores navigation updating history information relating to an updating history of map information stored in each navigation device 2 together with its navigation ID to identify the navigation device 2.

As indicated in FIG. 2, the navigation updating history information 51 in each navigation device 2 stores the version of map information currently stored in the navigation device 2 corresponding to each block ID assigned to the block of an approximately 2.5 km square area, sorted by the navigation ID that specifies the navigation device 2 and divided in three distribution road categories of high standard that represents high standard roads, ordinary that represents ordinary roads and narrow street that represents narrow streets.

For example, the versions of map information currently stored in the navigation device 2 with the navigation ID of 1001 are, in the area of block ID A, version 1 for the map data in the distribution road category of high standard, version 2 for the map data in the distribution road category of ordinary, and version 1 for the map data in the distribution road category of narrow street.

Every time the map information in the navigation device 2 is updated (described later), the navigation updating history information 51 the history is updated by storing the latest version corresponding to a distribution road category for each updated block ID (refer to FIG. 4).

When requested by the navigation device 2, the map information distribution center 3, updates the map information stored in the navigation device 2 with the latest version of updating map information 17 stored in the center map information database 14. Specifically, in the map information distribution system 1 of this example, when the navigation device 2 requests a distribution of updating map information 17 of a predefined area, the update is done by extracting differential data for updating to the latest version of updating map information 17 and distributing the differential data together with a distribution ID added to the navigation device 2 as described later (refer to FIG. 4). As for the differential data transmitted to the navigation device 2, for updating from the currently stored map information in the navigation device 2 to the latest version of updating map information 17, the bare minimum amount of data in each distribution road category is transmitted.

The distribution management information database 19 stores, for each distribution ID added to the differential data distributed to the navigation device 2, the block ID that represents each block of the area subject to distribute the differential data, and the updated version of a distribution road category for each block ID (refer to FIG. 8).

The map information distribution center 3 may be run by any individual, business company, organization, local government, and/or government affiliated organization as well as a VICS® (Vehicle Information and Communication System) center.

As for the network 4, a communication system of telecommunication networks such as a local area network (LAN), a wide area network (WAN), an intranet, a mobile telephone network, a telephone line network, a public telecommunication network, a private communication network, and the Internet can be used. Such communication systems that use communication satellite (CS) broadcasting and broadcast satellite (BS) broadcasting by broadcast satellites, terrestrial digital television broadcasting, and FM multiplex broadcasting may be used as well. Further, such communication systems as non-stop electronic toll collection system (ETC) and dedicated short range communication system (DSRC) used in intelligent transportation systems (ITS) may be used.

As indicated in FIG. 1, the PC 5 is configured to receive the distribution of map information of the latest version stored in the updating map information 17 by prefecture by communication with the map information distribution center 3 via the network 4. The PC 5 has a recorder 5A that records the received map information by prefecture on to a CD-ROM 6 as a storage medium so as to be readable by the reader 28 (refer to FIG. 3) in the navigation device 2. Magnetic disks such as a flexible disk, a memory card, a magnetic tape, a magnetic drum, an MD, a DVD, an MO, an IC card, an optical card and the like may be used in place of the CD-ROM 6.

Next, the outline of configurations of the navigation device 2 that is included in the map information distribution system 1 of the first example of the present invention is described with reference to FIG. 3. FIG. 3 is a block diagram of the navigation device 2 of the first example of the present invention.

Figure 3:
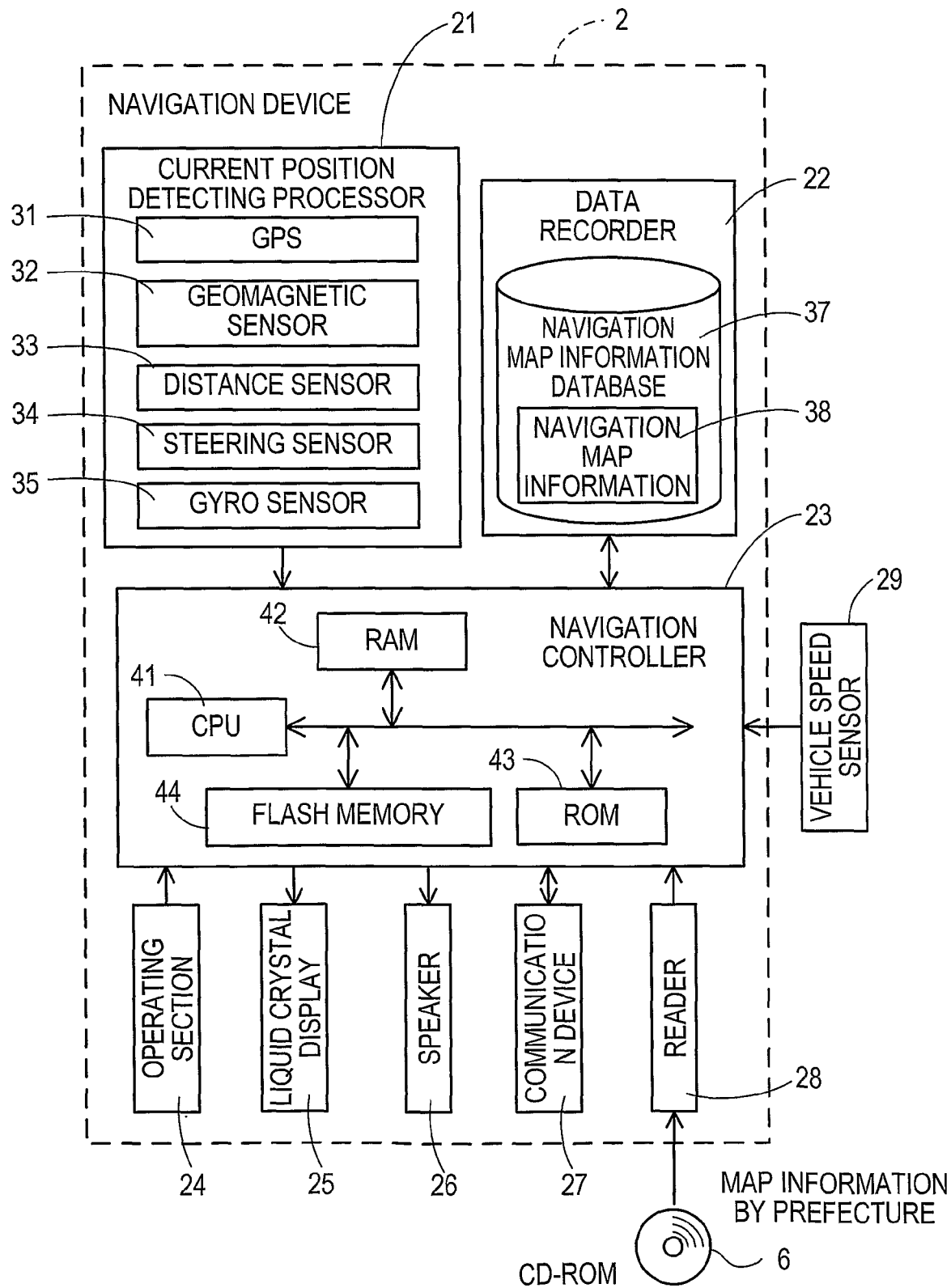
FIG. 3 is a block diagram of an exemplary navigation device in the map information distribution system.

As indicated in FIG. 3, the navigation device 2 includes a current position detecting processor 21 that detects the current position of a vehicle, and a data recorder 22 in which coordinates of a pre-registered home position (longitude and latitude, for example) and various types of data are recorded. The navigation device 2 includes a navigation controller 23 that performs various arithmetic processes based on the data entered, an operating section 24 that accepts operations made by an operator, a liquid crystal display 25 that displays data such as a map for the operator, a speaker 26 that outputs audio guidance relating to route guidance, a communication device 27 that makes communication with an information center such as a traffic information center and the map information distribution center 3, and a reader 28 that reads out the map information of a predefined version recorded by prefecture from the CD-ROM 6 as a storage medium. The navigation controller 23 is coupled with a vehicle speed sensor 29 that detects the driving speed of the vehicle. The reader 28 may be configured to read out the recorded map information and such, not only from the CD-ROM 6 but also from a DVD.

The current position detecting processor 21 includes a GPS 31, a geomagnetic sensor 32, a distance sensor 33, a steering sensor 34, a gyro sensor 35 as a direction detector, and an altimeter (not shown), and can detect the current position and direction of the vehicle, a distance to a landmark (an intersection, for example), and such. Specifically, the GPS 31 detects the current position of the vehicle on the ground and the current time by receiving radio waves emitted from satellites; the geomagnetic sensor 32 detects a direction of the vehicle by measuring the geomagnetic; and the distance sensor 33 detects the distance between predefined points on a road and such. As for the distance sensor 33, for example, a sensor that measures a rotation speed of the vehicle wheels (not shown) and detects a distance, based on the rotation speed measured, and a sensor that measures acceleration speed and double integrates the acceleration speed measured to obtain a distance may be used.

The steering sensor 34 detects a steering angle of the vehicle. As for the steering sensor 34, for example, an optical rotation sensor and a rotational resister sensor attached to a rotating section of a steering wheel (not shown), and an angle sensor attached to a wheel may be used. The gyro sensor 35 detects an angle of traverse. As for the gyro sensor 35, for example, a gas rate gyro and a vibrating gyro may be used. The direction of the vehicle can be detected by integrating the angle of traverse detected by the gyro sensor 35.

The data recorder 22 has a hard disk (not shown) as an external storage device and a storage medium, a navigation map information database 37 stored in the hard disk, and a recording head (not shown) as a driver to write predefined data to the hard disk as well as to read out predefined programs and such. Although the hard disk is used as an external storage device and a storage medium of the data recorder 22, magnetic disks such as a flexible disk may be used as an external storage device. A memory card, a magnetic tape, a magnetic drum, a CD, an MD, a DVD, an optical disc, an MO, an IC card, an optical card and the like may be used as an external storage device as well.

The navigation map information database 37 stores navigation map information 38 that is used for route guidance and route searching of the navigation device 2 and is the subject to update by the map information distribution center 3 as well. The navigation map information 38 includes, similar to the updating map information 17, various types of information required for route guidance and map display, for example, new road data to identify newly constructed roads, map display data to display maps, intersection data relating to intersections, node data relating to node points, link data, search data to search routes, shop data relating to POIs such as a shop as one of facilities, and spot search data to search spots. As the details of various types of data have been described already, their details are omitted here.

The content of the navigation map information database 37 is updated by downloading such updating information as differential data distributed from the map information distribution center 3 via the communication device 27 or updating map information recorded on the later described CD-ROM 6.

As indicated in FIG. 3, the navigation controller 23 included in the navigation device 2 has a CPU 41 as an arithmetic device and a controller to control the whole navigation device 2, a RAM 42 used as a working memory when the CPU 41 executes various arithmetic processes as well as to store route data and such when a route is searched, a ROM 43 storing, in addition to control programs, a program for implementing the later described method of navigation map information updating process (refer to FIG. 4, for example) that is executed when the engine is started and when a destination is set, and an internal storage device such as a flash memory 44 to store the programs read out from the ROM 43. As for the RAM 42, ROM 43 and flash memory 44, for example, a semiconductor memory and a magnetic core may be used. As for the arithmetic device and control device, an MPU and the like may be used in place of the CPU 41.

In this first example, although various programs are stored in the aforementioned ROM 43 and various types of data are stored in the aforementioned data recorder 22, programs and data may be read out from the same external storage device, memory card and such and stored to the aforementioned flash memory 44. Further, the aforementioned programs and data can be updated by replacing the memory card.

The aforementioned navigation controller 23 is electrically coupled with peripheral devices (actuators) of the operating section 24, the liquid crystal display 25, the speaker 26, the communication device 27, and the reader 28.

The operating section 24 is operated, for example, when correcting the current position at the start of drive, when entering a start point as a guidance start point and a destination as a guidance end point, and when searching data relating to facilities. The operating section 24 has a plurality of operating switches (not shown) such as various keys and a destination setting button. The navigation controller 23 performs various corresponding operations according to switch signals output by pressing of switches. As for the operating section 24, for example, a keyboard, a mouse, a barcode reader, a remote controller, a joystick, a light pen, and a stylus pen may be used. The operating section 24 may be configured with a touch panel attached to the front surface of the liquid crystal display 25.

The liquid crystal display 25 displays operation guidance, an operation menu, guidance of keys, a guidance route from the current position to the destination, guidance information along the guidance route, traffic information, news, weather forecasts, time, mail, television programs and such. A CRT display or a plasma display may also be used, as well as a hologram device that projects a hologram to the front window of the vehicle, in place of the liquid crystal display 25.

The speaker 26 outputs voice guidance of a name of facility as a destination selected and driving guidance along the guidance route according to instructions from the navigation controller 23. As for the voice guidance, for example, "the new road to the selected ski area has been updated," "200 meters ahead, right direction at ABC intersection" and "national road No. N ahead is congested" may be given. The sound output from the speaker 26 may also include various sound effects and various guidance information pre-recorded onto tapes and memories, other than synthesized voice.

The communication device 27 allows communication with the map information distribution center 3, and sends and receives the latest version of updating map information 17 of a predefined block area with the map information distribution center 3 as described later. In addition to the map information distribution center 3, it is also possible for the communication device 27 to receive traffic information including traffic congestion information, traffic control information, parking lot information, traffic accident information, and information on congestion of service areas and such transmitted from, for example, a VICS center.

In the map information distribution system 1 having the aforementioned configuration, a process of updating navigation map information performed by the CPU 41 in the navigation device 2 and the CPU 11 in the map information distribution center 3, when the engine is started or when a destination is set, to automatically update the navigation map information 38 in the navigation map information database 37 is described next referring to FIGS. 4-9.

An exemplary navigation map information updating method is described with reference to FIG. 4. The exemplary method may be implemented, for example, by one or more components of the above-described map information distribution system 1. For example, the exemplary method may be implemented by the CPU 11 and/or CPU 41 executing a computer program stored in the ROM 13 and/or ROM 43. However, even though the exemplary structure of the above-described navigation system 1 may be referenced in the description, it should be appreciated that the structure is exemplary and the exemplary method need not be limited by any of the above-described exemplary structure.

Figure 4:
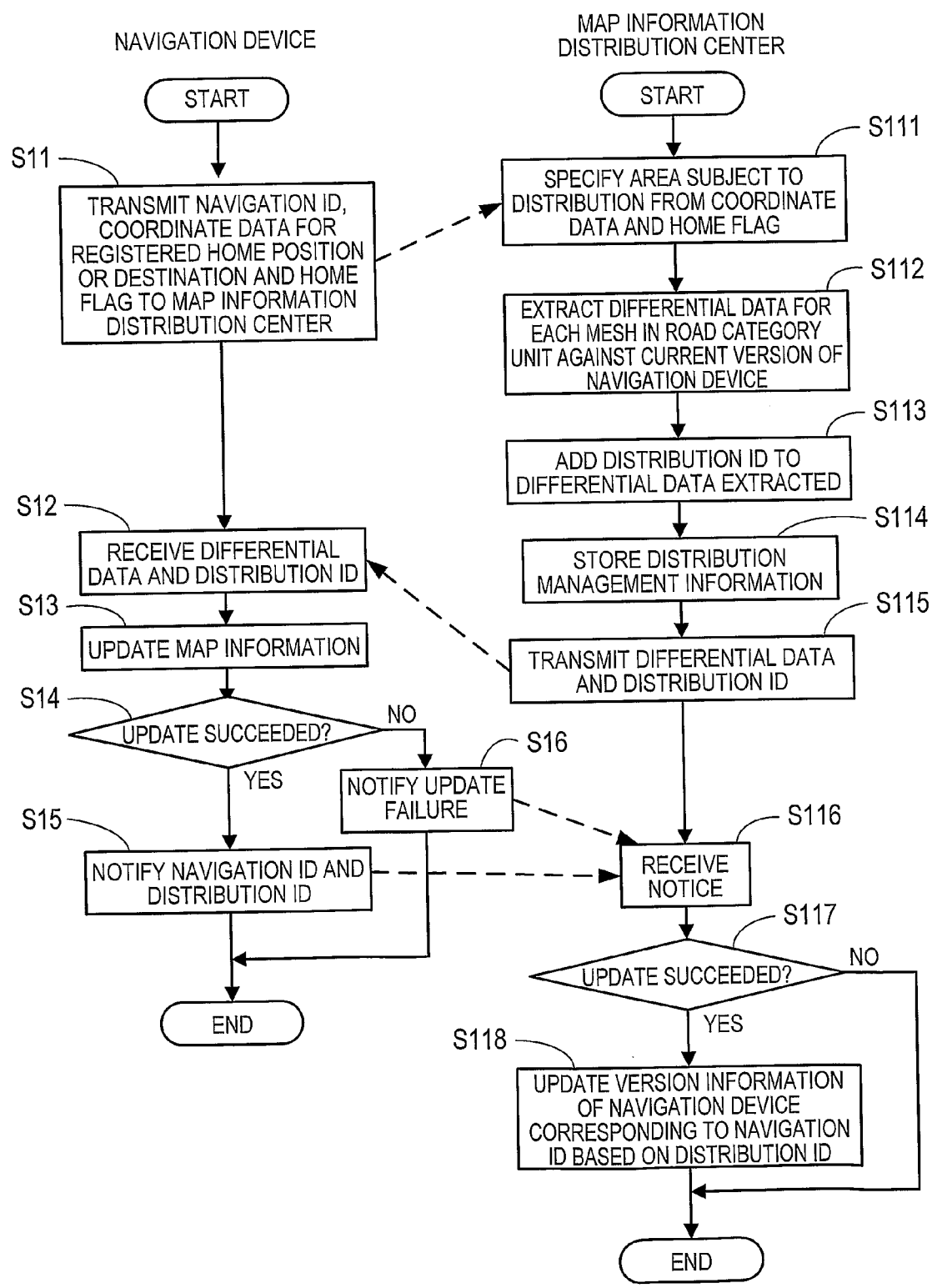
FIG. 4 is a flowchart of an exemplary navigation map information updating method.

As indicated in FIG. 4, in step (hereinafter "S") 11, when the engine is started by turning an ignition switch on, more specifically, when the navigation device 2 is powered as an accessory (ACC) is turned on, the CPU 41 reads out coordinate data of a predefined home position (for example, latitude and longitude of the home position, hereinafter "registered home position") from the data recorder 22 and stores the coordinate data of the registered home position to the RAM 42 as coordinate data to transmit to the map information distribution center 3. The CPU 41 also reads out a home flag (coordinate flag) from the RAM 42 and sets the home flag on. Specifically, the CPU 41 assigns a value of 1 to the home flag and stores it again to the RAM 42. The CPU 41 reads out coordinate data representing the registered home position and the home flag from the RAM 42 and transmits the coordinate data and home flag together with a navigation ID (for example, navigation ID 1001) that identifies the navigation device 2 to the map information distribution center 3.

In S11, when a destination is set with the operating section 24, the CPU 41 stores the coordinate data of the aforementioned destination to the RAM 42. The CPU 41 reads out the home flag from the RAM 42 and sets the aforementioned home flag to off. Specifically, the CPU 41 assigns a value of 0 to the home flag and stores it again to the RAM 42. The CPU 41 reads out the coordinate data of the destination and home flag from the RAM 42 and transmits the coordinate data and home flag together with the navigation ID that identifies the navigation device 2 to the map information distribution center 3.

Meanwhile, as indicated in FIG. 4, the CPU 11 in the map information distribution center 3, when receiving the coordinate data and home flag transmitted from the navigation device 2 together with the navigation ID that identifies the navigation device 2 via the center communication device 16 in S111, stores the aforementioned navigation ID, coordinate data and home flag to the RAM 12.

The CPU 11 reads out the coordinate data and home flag from the RAM 12 again. When the value of the home flag is 1, the CPU 11 sets a predefined area centered by the coordinate data as a first area (for example, an area of an approximately 80 km square centered by the coordinate data) as an area subject to distribution of differential data. Specifically, the first area centered by the registered home position is set as the area subject to distribute to extract differential data.

The CPU 11 reads out the coordinate data and home flag from the RAM 12 again. When the value of home flag is 0, the CPU 11 sets a predefined area centered by the coordinate data as a second area (for example, an area of an approximately 10 km square) as an area subject to distribution of differential data. Specifically, the second area centered by the destination is set as the area subject to distribution of differential data.

In S112, the CPU 11 reads out the navigation ID received in S111 from the RAM 12 and the information relating to the updating history of the navigation device 2, that is identified by the navigation ID, of the area set in S111 from the navigation updating history information database 15, extracts the current version of the navigation device 2 in distribution road categories of high standard, ordinary and narrow street in each block (mesh) of an approximately 2.5 km square of the area subject to distribute, and stores them to the RAM 12. The CPU 11 reads out the differential data file name representing the differential data of the latest version in each block of the distribution area from the differential data management database 18, extracts the differential data file name between the current version in each block of the distribution area in the navigation device 2 and the latest version, and stores them to the RAM 12. Then, the CPU 11 reads out the differential data corresponding to each differential data file name from the updating map information 17 and stores them to the RAM 12.

Figure 5:
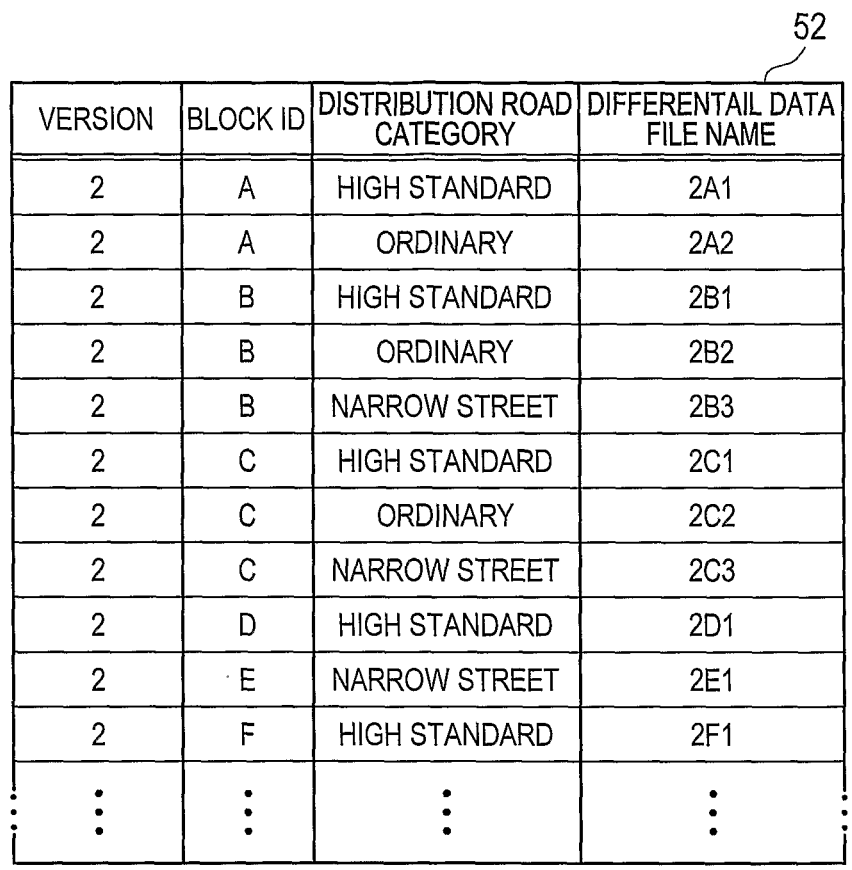
FIG. 5 is a chart showing an example of differential data management information stored in a differential data management database in the map information distribution center.
Figure 6:
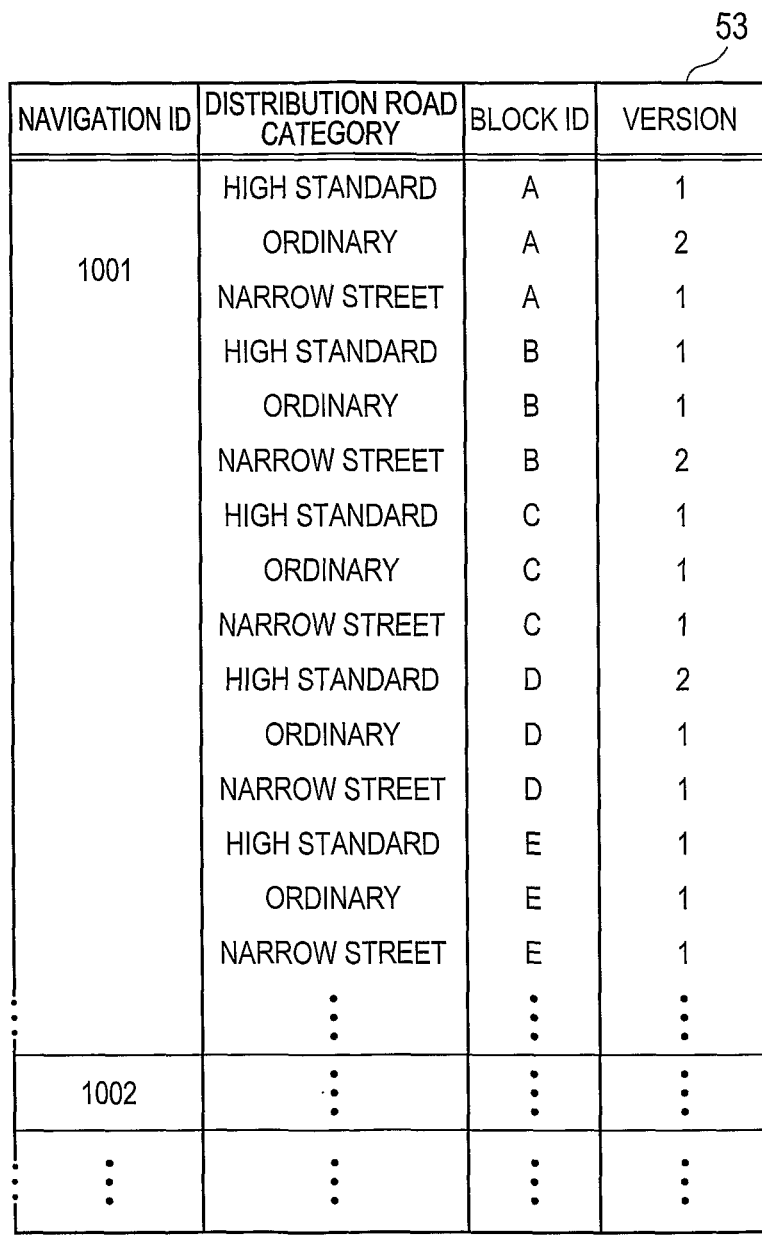
FIG. 6 is a chart showing an example of navigation updating history information stored in a navigation updating history information database in the map information distribution center.

An example of extracting differential data between the current version of the navigation device 2 in distribution road categories of high standard, ordinary and narrow street in each block (mesh) of the distribution area and the latest version performed by the CPU 11 is specifically described referring to FIGS. 5 to 7. To simplify the description, the distribution area is set as two blocks of an approximately 2.5 km square. However, when the distribution area is 80 km square, 1024 blocks (mesh) of an approximately 2.5 km square each are included. When a distribution area is 10 km square, 16 blocks (mesh) of an approximately 2.5 km square each are included.

FIG. 5 is a chart showing one example of differential data management information 52 stored in the differential data management database 18 in the map information distribution center 3. FIG. 6 is a chart showing one example of navigation updating history information 53 stored in the navigation updating history information database 15 in the map information distribution center 3. FIG. 7 is an illustration describing one example of extracted differential data in each block (mesh) of the distribution area.

As indicated in FIG. 5, the differential data management information 52 stored in the differential data management database 18 in the map information distribution center 3 stores, for individual block IDs (A, B, C, D, and so on) representing each block of an approximately 2.5 km square, the differential data file name that represents differential data for updating to the map information of the latest version stored in the updating map information 17 that is version 2 sorted by the road standards of three distribution road categories.

For example, the differential data file names for updating the map information of the block of an approximately 2.5 km square with the block ID of A to version 2 are 2A1 for high standard roads and 2A2 for ordinary roads. As indicated in FIG. 6, the navigation updating history information 53 stored in the navigation updating history information database 15 in the map information distribution center 3 stores, for the area of each block of an approximately 2.5 km square with block IDs (A, B, C, D, and so on), the version of map information currently stored in the navigation device 2 with the navigation ID of 1001 in three distribution road categories of high standard roads, ordinary roads and narrow streets. For example, the versions of map information currently stored in the navigation device 2 with the navigation ID of 1001 are 1 for the map data in the distribution road category of high standard, 2 for the map data in the distribution road category of ordinary and 1 for the map data in the distribution road category of narrow street.

The CPU 11 receives the data of 1001 as the navigation ID in S111 and stores it to the RAM 12. When the blocks of block IDs of A and B are set as the distribution area, the CPU 11 reads out the version for each distribution road category corresponding to the blocks of block IDs of A and B that corresponds to the navigation ID of 1001 from the navigation updating history information 53 and stores them to the RAM 12. The CPU 11 reads out each distribution road category corresponding to the blocks of block IDs of A and B from the differential data management information 52 and judges whether the version in the navigation updating history information 53 corresponding to each distribution road category read out is version 2.

Next, as indicated in FIG. 7, when the version of the navigation updating history information 53 corresponding to each distribution road category read out from the differential data management information 52 is not version 2, the CPU 11 reads out the differential data file names corresponding to each distribution road category from the differential data management information 52 and stores the differential data file names of 2A1, 2B1 and 2B2 to the RAM 12 in sequence. The CPU 11 then reads out the differential data corresponding to the differential data file names of 2A1, 2B1 and 2B2 from the updating map information 17 and stores them to the RAM 12 as the differential data to be distributed to the navigation device 2 of the navigation ID of 1001.

In S113, the CPU 11 selects a distribution ID to identify the extracted differential data and stores it to the RAM 12. In S114, the CPU 11 stores distribution management information that includes the distribution ID to identify the extracted differential data, the block ID to represent each block of the distribution area corresponding to the differential data, and the updated version for each distribution road category of each block ID to the distribution management information database 19.

An example of the distribution management information stored in the distribution management information database 19 is described referring to FIG. 8. FIG. 8 is a chart showing one example of distribution management information 54 corresponding to each piece of the extracted differential data of the distribution area shown in FIG. 7.

As indicated in FIG. 8, the CPU 11 selects the data of T00001 as the distribution ID to identify the differential data corresponding to the extracted differential data file names of 2A1, 2B1 and 2B2, and stores the aforementioned data of T00001 as the distribution ID of the distribution management information 54. The CPU 11 stores the block IDs of A, B and B that represent the blocks of the distribution area corresponding to the differential data file names of 2A1, 2B1 and 2B2, respectively, as the block ID of the distribution management information 54. The CPU 11 stores the distribution road categories of high standard, high standard and ordinary that represent the distribution road categories corresponding to the differential data file names of 2A1, 2B1 and 2B2, respectively, as the distribution road category of the distribution management information 54. The CPU 11 stores the version of 2 corresponding to the differential data file names of 2A1, 2B1 and 2B2 as the version of the distribution management information 54.

In S115, the CPU 11 reads out the differential data extracted in S112 and the distribution ID given to the differential data in S113 from the RAM 12 and distributes them to the navigation device 2. For example, as indicated in FIG. 8, the CPU 11 distributes the differential data corresponding to the differential data file names of 2A1, 2B1 and 2B2, and the distribution ID of T00001 given to the differential data to the navigation device 2.

Meanwhile, as indicated in FIG. 4, the CPU 41 in the navigation device 2, when receiving the differential data and the distribution ID from the map information distribution center 3 via the communication device 27 in S12, stores the differential data and the distribution ID to the RAM 42. In S13, the CPU 41 reads out the received differential data from the RAM 12 and updates the map information of the distribution area in the navigation map information 38 to the map information of the latest version.

Then, in S14, the CPU 41 checks the updating of map information of the distribution area in the navigation map information 38 and determines whether there is any errors in updating map information. When there is no error in updating map information of the distribution area in the navigation map information 38, i.e., when the update of map information of the distribution area is successful (S14: YES), the CPU 41 moves on to the process in S15. In S15, the CPU 41 reads out the distribution ID received in S12 from the RAM 42, notifies the success of updating the navigation map information 38 by transmitting the distribution ID together with the navigation ID that has been transmitted to the map information distribution center 3 in S11 to identify the aforementioned navigation device 2 to the map information distribution center 3, and then finishes the relevant process.

For example, when there is no error in updating map information in the block IDs of A and B of the distribution area in the navigation map information 38 (S14: YES), the CPU 41 notifies the success of updating the navigation map information 38 by transmitting the distribution ID of T00001 received in S12 and the navigation ID of 1001 to identify the navigation device 2 that has been transmitted to the map information distribution center 3 in S11 to the map information distribution center 3, and then finishes the relevant process.

Meanwhile, when there is an error in updating map information of the distribution area in the navigation map information 38, i.e., when updating map information of the distribution area is failed (S14: NO), the CPU 41 moves on to the process in S16. In S16, the CPU 41 notifies the failure of updating the navigation map information 38 by transmitting only the navigation ID that has been transmitted to the map information distribution center 3 in S11 to identify the navigation device 2 to the map information distribution center 3, and then finishes the relevant process. For example, the CPU 41 notifies the failure of updating the navigation map information 38 by transmitting only the navigation ID of 1001 to identify the navigation device 2 that has been transmitted to the map information distribution center 3 in S11 to the map information distribution center 3, and then finishes the relevant process.

Meanwhile, as indicated in FIG. 4, the CPU 11 in the map information distribution center 3, when the notice of success or failure of updating the navigation map information 38 transmitted from the navigation device 2 is received in S116, stores the aforementioned notice to the RAM 12 and then moves on to the process in S117.

In S117, the CPU 11 reads out the notice from the RAM 12 again and determines whether updating the navigation map information 38 in the navigation device 2 has been successful, i.e., whether both the distribution ID and navigation ID have been received. When both the distribution ID and the navigation ID have not been received, that is, when only the navigation ID has been received (S117: NO), the CPU 11 determines that updating the navigation map information 38 in the navigation device 2 identified by the navigation ID has failed and finishes the relevant process. Therefore, for example, when the aforementioned navigation ID is 1001, the navigation updating history information 53 (refer to FIG. 6) corresponding to the navigation device 2 identified by the navigation ID of 1001 is not updated.

Meanwhile, when both the distribution ID and the navigation ID have been received (S117: YES), the CPU 11 judges that updating the navigation map information 38 in the navigation device 2 identified by the aforementioned navigation ID has been successful and moves on to the process in S118. In S118, the CPU 11 reads out the distribution ID stored in S116 from the RAM 12 again and reads out the distribution management information corresponding to the distribution ID from the distribution management information database 19, and stores them to the RAM 12. The CPU 11 renews the version of updating history data stored in the navigation updating history information database 15 specified by the navigation ID stored in S116 to the version corresponding to each distribution road category and block ID of the distribution management information stored in the RAM 12, and then stores them again to the navigation updating history information database 15 and finishes the relevant process. This makes it possible for the updating history data stored in the updating history database 15 that is specified by the navigation ID to reliably agree with the current version information stored in the navigation map information 38 in the navigation device 2 specified by the navigation ID.

An example of updating the navigation updating history information 53 shown in FIG. 6 is described referring to FIGS. 8 and 9. FIG. 9 is a chart showing one example of the updated navigation updating history information 53 shown in FIG. 6 based on the distribution management information 54 shown in FIG. 8.

For example, when the distribution ID of T00001 and the navigation ID of 1001 are received in S116, the CPU 11 reads out the versions of 2, 2, and 2 corresponding to the distribution road categories of high standard, high standard, and ordinary and the block IDs of A, B, and B that correspond to the aforementioned distribution ID of T00001 from the distribution management information 54 (refer to FIG. 8) stored in the distribution management information database 19 and stores them to the RAM 12.

As indicated in FIG. 9, the CPU 11 creates the navigation updating history information 55 by renewing the version in the updating history data 53 (refer to FIG. 6) stored in the updating history database 15 specified by the navigation ID of 1001 stored in S116 to the versions of 2, 2 and 2 corresponding to the distribution road categories of high standard, high standard and ordinary and the block IDs of A, B and B stored in the distribution management information 54 (refer to FIG. 8) stored in the RAM 12, and stores them again to the navigation updating history information database 15 and then finishes the relevant process. This makes it possible for the updating history data 55 specified by the navigation ID of 1001 stored in the updating history database 15 to reliably agree with the current version information stored in the navigation map information 38 in the navigation device 2 specified by the navigation ID of 1001.

Next, in the map information distribution system 1 having the aforementioned configuration, the process of updating the navigation updating history information stored in the navigation updating history information database 15 in the map information distribution center 3, when the navigation map information 38 in the navigation device 2 is updated based on the updating map information by prefecture that has been distributed to the PC 5 from the aforementioned map information distribution center 3 and recorded on to the CD-ROM 6, is described referring to FIGS. 10 to 15.

Figure 10:
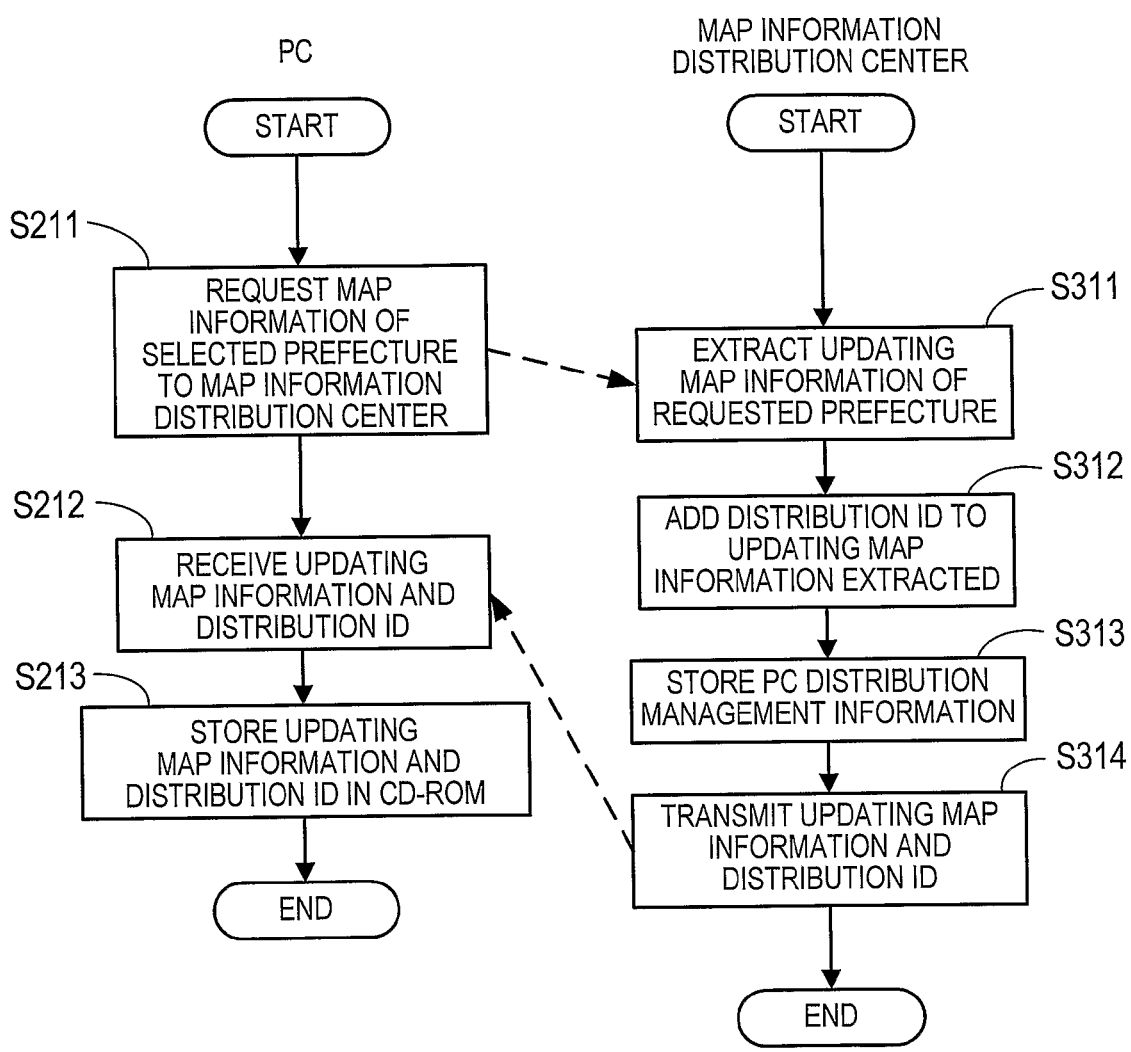
FIG. 10 is a flowchart of an exemplary storage medium recording method.
Figure 12:
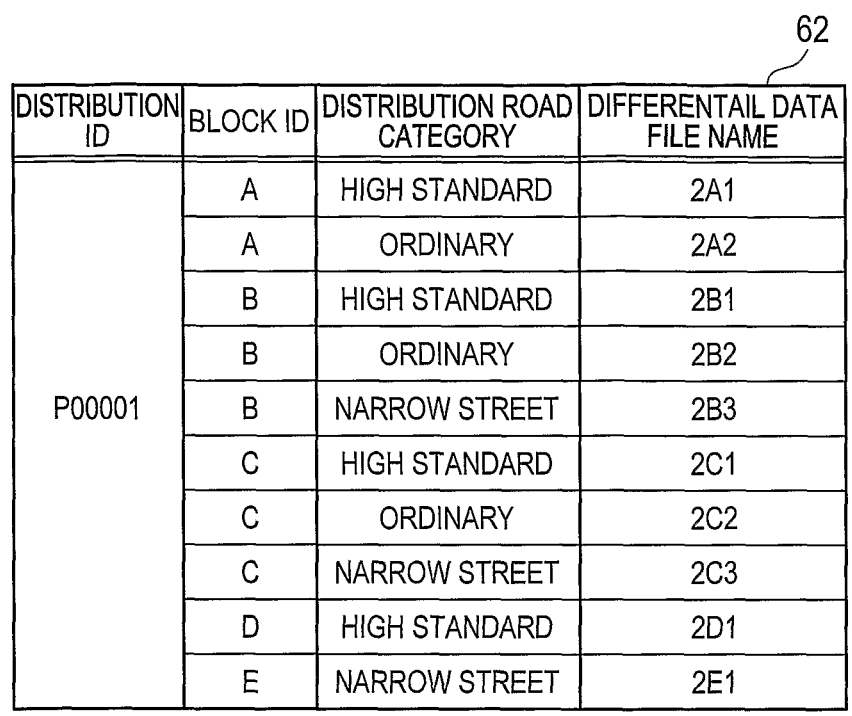
FIG. 12 is a chart showing one example of updating map information by prefecture recorded on a CD-ROM in step 213 of the flowchart indicated in FIG. 10.

The storage medium recording process to record the updating map information by prefecture on to the CD-ROM 6 that is performed by the map information distribution center 3 and the PC 5 is described first referring to FIGS. 10 to 12.

An exemplary storage medium recording method is described with reference to FIG. 10. The exemplary method may be implemented, for example, by one or more components of the above-described map information distribution system 1. For example, the exemplary method may be implemented by the CPU 11 and/or a CPU of PC 5 executing a computer program stored in the ROM 13 and/or a ROM of PC 5. However, even though the exemplary structure of the above-described navigation system 1 may be referenced in the description, it should be appreciated that the structure is exemplary and the exemplary method need not be limited by any of the above-described exemplary structure.

As indicated in FIG. 10, the PC 5 first transmits, in S211, prefecture data that represents the names of prefectures (for example, Tokyo, Osaka, Hokkaido, Aichi and so on) selected by the user and a prefectural unit request signal that requests the updating information (differential data) of map information for each selected prefecture to the map information distribution center 3.

Meanwhile, as indicated in FIG. 10, the CPU 11 in the map information distribution center 3, when receiving the prefecture data and the prefectural unit request signal that is the request of updating information (differential data) of map information by prefecture transmitted from the PC 5 via the center communication device 16 in S311, stores the prefecture data to the RAM 12.

The CPU 11 reads out the prefecture data again from the RAM 12, sets the prefecture specified by the prefecture data as the distribution area (distribution area) by prefecture to extract differential data, then reads out the differential data management information of the latest version in each block within the distribution area (distribution area) by prefecture as mentioned above from the differential data management database 18 and stores them to the RAM 12. Then, the CPU 11 reads out the differential data corresponding to the differential data file names in the differential data management information stored in the RAM 12 from the updating map information 17 and stores them to the RAM 12.

For example, when the prefecture data read out from the RAM 12 is about an X prefecture, the CPU 11 sets the X prefecture as the distribution area by prefecture to extract differential data. When the blocks (mesh) of an approximately 2.5 km square within the distribution area (distribution area) are A, B, C, D and E (refer to FIG. 14), the CPU 11 reads out in sequence the differential data management information (version, block ID, distribution road category and differential data file name) of the latest version corresponding to each block of the block IDs A to E from the differential data management information 52 (refer to FIG. 5) stored in the differential data management database 18, and stores them to the RAM 12. Therefore, the CPU 11 stores the data of "version 2, block A, high standard, 2A1," "version 2, block A, ordinary, 2A2,"... "version 2, block E, narrow street, 2E1," as the differential data management information of the latest version to the RAM 12. Then, the CPU 11 reads out the differential data corresponding to the differential data file names of 2A1, 2A2, 2B1, ... 2E1 in the differential data management information stored in the RAM 12 from the updating map information 17, and stores them to the RAM 12.

To simplify the description, the blocks of an approximately 2.5 km square in the X prefecture set as the distribution area by prefecture are set as five blocks of the block IDs A to E. Although the prefecture data is set as one prefecture as the X prefecture, a plurality of prefectures may be set as the distribution area (distribution area).

In S312, the CPU 11 selects the distribution ID that identifies the extracted differential data by prefecture, and stores it to the RAM 12. In S313, the CPU 11 creates PC distribution management information that includes distribution ID that identifies the extracted differential data by prefecture, block IDs that represent each block, distribution road categories and versions in the differential data management information of the latest version of each block of the distribution area stored in the RAM 12, and stores it to the distribution management information database 19 as the distribution management information to manage the differential data by prefecture to be distributed to the PC 5.

An example of PC distribution management information stored in the distribution management information database 19 is described referring to FIG. 11. FIG. 11 is a chart showing one example of PC distribution management information 61 stored in the distribution management information database 19 in S313 of the flowchart indicated in FIG. 10.

As indicated in FIG. 11, the CPU 11 selects P00001 as the distribution ID that identifies the extracted differential data by prefecture of the X prefecture and stores P00001 as the distribution ID of the PC distribution management information 61. The CPU 11 reads out the block ID, the distribution road category and the version in sequence from the latest version of differential data management information of the X prefecture stored in the RAM 12 as "version 2, block A, high standard, 2A1," "version 2, block A, ordinary, 2A2,"... "version 2, block E, narrow street, 2E1," and stores them to the distribution management information database 19 by storing them in sequence as the block IDs, distribution road categories and versions of the PC distribution management information 61 corresponding to the distribution ID of P00001.

Therefore, the CPU 11 stores, as the PC distribution management information 61 specified by the distribution ID of P00001, the data of A, A, B, ... E as the block IDs in sequence, the data of high standard, ordinary, high standard, ... narrow street as the distribution road categories in sequence, and the data of 2 as the version in sequence.

In S314, the CPU 11 reads out the block IDs and distribution road categories in the differential data management information of the latest version in each block of the distribution area by prefecture set in S311 above, the differential data corresponding to the block IDs, and the distribution ID that identifies the differential data by prefecture extracted in S312 above from the RAM 12, and then distributes them to the PC 5, and finishes the relevant process after distribution.

For example, the CPU 11 reads out, among the differential data management information by prefecture of the X prefecture, the block IDs of A, A, B, ... E, the distribution road categories of high standard, ordinary, high standard, ... narrow street, the differential data of 2A1, 2A2, 2B1, ... 2E1 corresponding to the differential data file names of 2A1, 2A2, 2B1, ... 2E1, and the distribution ID of P00001 from the RAM 12, and then distributes them to the PC 5, and finishes the relevant process after distribution.

Meanwhile, as indicated in FIG. 10, when receiving the block IDs and distribution road categories of the differential data management information by prefecture, the differential data corresponding to the block IDs, and the distribution ID that identifies the differential data by prefecture from the map information distribution center 3 via the communication device 27 in S212, the CPU 71 in the PC 5 stores these data to the RAM 72 not shown.

In S213, the PC 5 reads out the received block IDs and distribution road categories of the differential data management information by prefecture, the differential data corresponding to the block IDs, and the distribution ID that specifies the differential data by prefecture in sequence, and records them on to the CD-ROM 6 via the recorder 5A so as to be readable by the CPU 41 in the navigation device 2 via the reader 28 as the updating map information by prefecture, and then finishes the relevant process.

An example of updating map information by prefecture recorded on to the CD-ROM 6 is described referring to FIG. 12. FIG. 12 is a chart showing one example of updating map information by prefecture recorded on the CD-ROM 6 in S213 of the flowchart indicated in FIG. 10. When the block IDs of "A, A, B, ... E" of the differential data management information by prefecture of the X prefecture, the distribution road categories of "high standard, ordinary, high standard, ... narrow street," the differential data of "2A1, 2A2, 2B1, ... 2E1," and the distribution ID of P00001 are distributed from the map information distribution center 3 to the PC 5, as indicated in FIG. 12, the PC 5 creates the updating map information 62 by prefecture that stores P00001 as the distribution ID, "A, A, B, ... E" as the block IDs in sequence, "high standard, ordinary, high standard, ... narrow street" as the distribution road categories in sequence, and "2A1, 2A2, 2B1, ... 2E1" as the differential data in sequence, and records the updating map information 62 by prefecture on to the CD-ROM 6 via the recorder 5A so as to be readable by the CPU 41 in the navigation device 2 via the reader 28.

Figure 13:
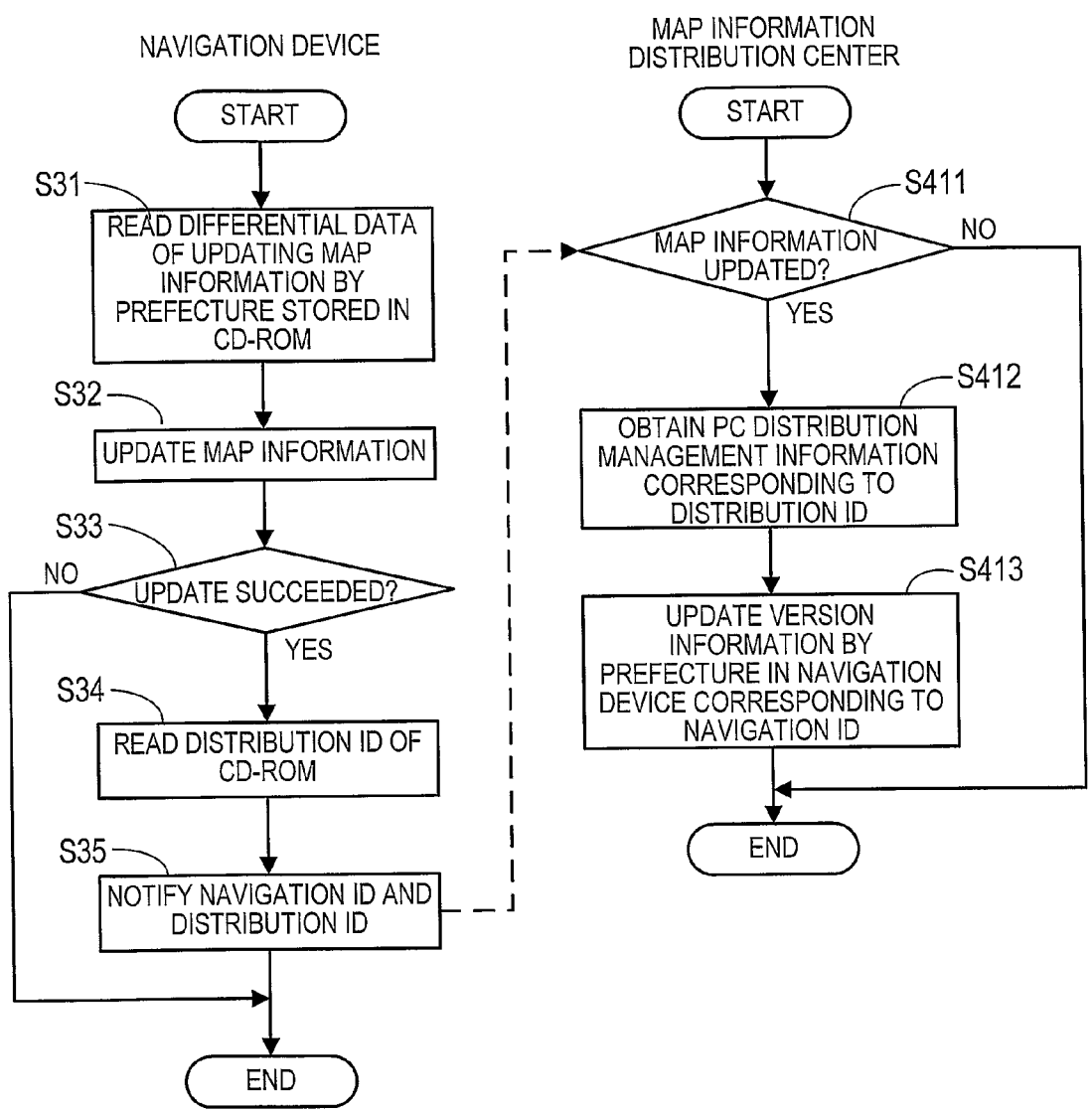
FIG. 13 is a flowchart of an exemplary updating method of navigation updating history information in the aforementioned map information distribution center when navigation map information in the navigation device is updated via the CD-ROM created in the storage medium recording process indicated in FIG. 10.
Figure 14:
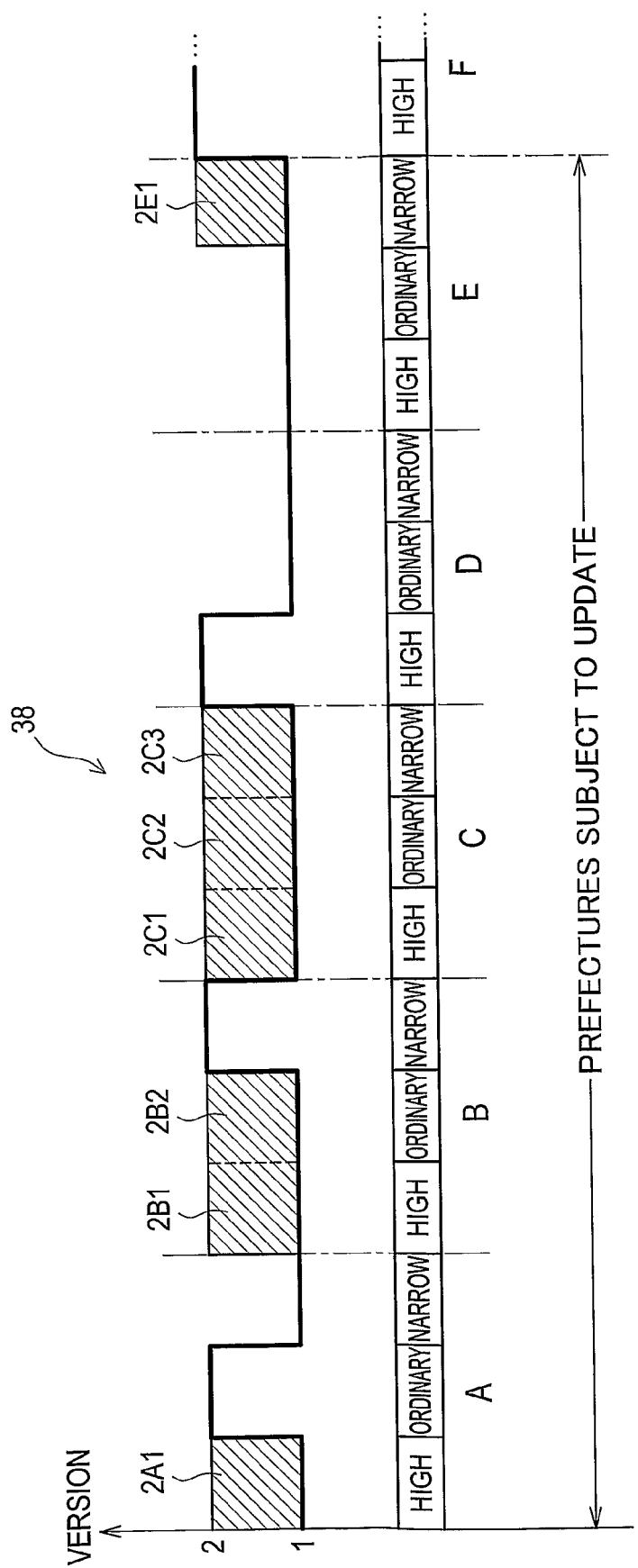
FIG. 14 is an illustration describing an example of updated navigation map information in the navigation device via the CD-ROM in which updating map information shown in FIG. 12 is recorded in step 32 of the flowchart indicated in FIG. 13.

Next, when the navigation map information 38 in the navigation device 2 is updated based on the updating map information by prefecture that has been recorded on to the CD-ROM 6 prepared in the storage medium recording process indicated in FIG. 10, the process of updating the navigation updating history information stored in the navigation updating history information database 15 in the aforementioned map information distribution center 3 is described referring to FIGS. 13 to 15.

An exemplary updating method is described with reference to FIG. 13. The exemplary method may be implemented, for example, by one or more components of the above-described map information distribution system 1. For example, the exemplary method may be implemented by the CPU 11 and/or CPU 41 executing a computer program stored in the ROM 13 and/or ROM 43. However, even though the exemplary structure of the above-described navigation system 1 may be referenced in the description, it should be appreciated that the structure is exemplary and the exemplary method need not be limited by any of the above-described exemplary structure.

As indicated in FIG. 13, in S31, the CPU 41 in the navigation device 2 first reads out the block IDs, distribution road categories and the differential data corresponding to the block IDs from the updating map information by prefecture recorded on the CD-ROM 6 via the reader 28 and stores them to the RAM 42.

In S32, the CPU 41 determines whether the current version of the map information of the distribution area by prefecture in the navigation map information 38 corresponding to each distribution road category of the block IDs stored in the RAM 42 is older than the latest version of each piece of the differential data stored in the aforementioned RAM 42. When the version is older, the CPU 41 updates the map information based on the corresponding differential data of the latest version.

An example of the updated navigation map information 38 in the navigation device 2 via the CD-ROM 6 in that the updating map information 62 by prefecture shown in FIG. 12 is recorded is described referring to FIG. 14. As indicated in FIG. 14, the CPU 41 first determines whether the version corresponding to the distribution road category of high standard in the block ID of A in the navigation map information 38 is version 2 based on the updating map information 62 by prefecture that has been read out from the CD-ROM 6 and stored in the RAM 42. When the version is not version 2, the CPU 41 updates the map information corresponding to the distribution road category of high standard in the block ID of A in the navigation map information 38 to version 2 based on the differential data 2A1 stored in the RAM 42.

Next, the CPU 41 determines whether the version corresponding to the distribution road category of ordinary in the block ID of A in the navigation map information 38 is version 2 based on the updating map information 62 by prefecture stored in the RAM 42. When the version is version 2, the map information of the distribution road category of ordinary in the block ID of A in the navigation map information 38 is not updated. The CPU 41 updates, in a similar manner based on the updating map information 62 by prefecture stored in the RAM 42, the map information of the distribution road categories of high standard and ordinary in the block ID of B, the distribution road categories of high standard, ordinary and narrow street in the block ID of C, and the distribution road category of narrow street in the block ID of E in the navigation map information 38 to the latest version of version 2 based on the differential data of 2B1, 2B2, 2C1 to 2C3 and 2E1, respectively.

In S33, the CPU 41 checks the updating of map information of the distribution area by prefecture in the navigation map information 38 updated in S32 above and determines whether there are any errors in updating map information. When there is an error in updating map information in the distribution area by prefecture in the navigation map information 38, i.e., when updating map information in the distribution area by prefecture is failed (S33: NO), the CPU 41 notifies the failure of updating map information to the user and finishes the relevant process.

Meanwhile, when there is no error in updating map information in the distribution area by prefecture in the navigation map information 38, i.e., when updating map information in the distribution area by prefecture is successful (S33: YES), the CPU 41 moves on to the process in S34. In S34, the CPU 41 reads out the distribution ID stored in the CD-ROM 6 and stores it to the RAM 42. For example, when the CD-ROM 6 stores the updating map information 62 by prefecture shown in FIG. 12, the CPU 41 reads out the distribution ID of P00001 and stores it to the RAM 42.

In S35, the CPU 41 reads out the distribution ID again from the RAM 42, notifies the updating of the navigation map information 38 via the CD-ROM 6 by transmitting the distribution ID together with the navigation ID that has been transmitted to the map information distribution center 3 in S11 above and identifies the aforementioned navigation device 2 to the map information distribution center 3, and then finishes the relevant process.

For example, the CPU 41 notifies the updating of the navigation map information 38 via the CD-ROM 6 by transmitting the distribution ID of P00001 stored in the RAM 42 in S34 and the navigation ID of 1001 that identifies the aforementioned navigation device 2 and has been transmitted to the map information distribution center 3 in S11 above to the map information distribution center 3, and then finishes the relevant process.

Meanwhile, as indicated in FIG. 13, the CPU 11 in the map information distribution center 3 judges, in S411, whether the notice of updating the navigation map information 38 from the navigation device 2 has been received, i.e., whether the distribution ID and the navigation ID have been received. When the distribution ID and the navigation ID are not received (S411: NO), the CPU 11 finishes the relevant process. Therefore, for example, the navigation updating history information 53 (refer to FIG. 6) corresponding to the navigation device 2 specified by the navigation ID of 1001 is not updated.

Meanwhile, when the distribution ID and the navigation ID are received (S411: YES), the CPU 11 determines that the navigation map information 38 in the navigation device 2 specified by the aforementioned navigation ID has been updated, stores the distribution ID and the navigation ID to the RAM 12, and then moves on to the process in S412. In S412, the CPU 11 reads out the distribution ID from the RAM 12 again, reads out the PC distribution management information corresponding to the distribution ID from the distribution management information database 19, and stores them to the RAM 12.

In S413, the CPU 11 renews the version of updating history data stored in the navigation updating history information database 15 specified by the navigation ID stored in S411 to the version corresponding to each distribution road category and block ID in the PC distribution management information stored in the RAM 12, then stores them again to the navigation updating history information database 15, and finishes the relevant process. This makes it possible for the updating history data stored in the updating history database 15 that is specified by the navigation ID to reliably agree with the current version information stored in the navigation map information 38 in the navigation device 2 specified by the navigation ID that has been updated based on the updating map information stored in the CD-ROM 6.

An example of updating the navigation updating history information 53 shown in FIG. 6 is described referring to FIGS. 11 and 15. FIG. 15 is a chart showing one example of the updated navigation updating history information 53 shown in FIG. 6 based on the PC distribution management information 61 shown in FIG. 11. For example, when receiving the distribution ID of P00001 and the navigation ID of 1001 in S411 above, the CPU 11 reads out the versions of "2, 2, 2, . . . 2" corresponding to the block ID data of "A, A, B, . . . E" and the distribution road categories of "high standard, ordinary, high standard, . . . narrow street" corresponding to the aforementioned distribution ID of P00001 from the PC distribution management information 61 (refer to FIG. 11) stored in the distribution management information database 19, and stores them to the RAM 12.

As indicated in FIG. 15, the CPU 11 creates the navigation updating history information 63 by renewing the version of the updating history data 53 (refer to FIG. 6) stored in the updating history database 15 specified by the navigation ID of 1001 stored in S411 to the versions of "2, 2, 2, . . . 2" corresponding to the block IDs of "A, A, B, . . . E" and the distribution road categories of "high standard, ordinary, high standard, . . . narrow street" in the PC distribution management information 61 (refer to FIG. 11) stored in the RAM 12, stores them in the updating history database 15 again, and then finishes the relevant process.

This makes it possible for the updating history data 63 specified by the navigation ID of 1001 stored in the updating history database 15 to reliably agree with the current version information stored in the navigation map information 38 in the navigation device 2 specified by the navigation ID of 1001 that has been updated based on the updating map information 62 by prefecture (refer to FIG. 12) stored in the CD-ROM 6.

As described in detail above, in the map information distribution center 3 of the first example, when receiving the coordinate data and home flag together with the navigation ID that specifies the navigation device 2, the CPU 11 sets the first area centered by the coordinate data of the registered home position as the distribution area while the home flag is ON, and sets the second area centered by the coordinate data of a destination as the distribution area while the home flag is OFF (S11 and S111). The CPU 11 extracts the differential data between the current version in the navigation device 2 and the latest version of each block of the distribution area, by reading out the data relating to the updating history of the distribution area in the navigation device 2 specified by the navigation ID from the navigation updating history information database 15, and the current version of each block (mesh) of an approximately 2.5 km square in the distribution area in distribution road categories of high standard, ordinary and narrow street in the navigation device 2, as well as the differential data file name that represents the differential data of the latest version in each distribution road category of the blocks in the distribution area from the differential data management database 18 (S113). Next, the CPU 11 selects a distribution ID that identifies the differential data extracted and stores the distribution management information that includes the distribution ID, the block ID that represents each block of the distribution area corresponding to the differential data, and the updated version of the distribution road categories in each block ID to the distribution management information database 19, and then transmits the distribution ID and the differential data to the navigation device 2 (S114 to S115).

Meanwhile, the CPU 41 in the navigation device 2, when the navigation map information 38 is updated based on the received differential data, transmits the received distribution ID and the navigation ID that identifies the aforementioned navigation device 2 to the map information distribution center 3 (S12 to S16).

The CPU 11 in the map information distribution center 3, when receiving the distribution ID and the navigation ID, determines the navigation map information 38 in the navigation device 2 has been updated, and updates the updating history data specified by the navigation ID stored in the updating history database 15 by reading out the distribution management information corresponding to the distribution ID from the distribution management information database 19 and renewing the version of updating history data stored in the updating history database 15 specified by the navigation ID to the version corresponding to the distribution road categories and the block IDs in the distribution management information (S116 to S118).

This makes it possible for the map information distribution center 3, when the coordinate data and home flag are received together with the navigation ID from the navigation device 2, to extract the differential data between the current version of the navigation device 2 in each block in the distribution area and the latest version in each distribution road category and transmit them to the navigation device 2 by reading out the differential data file name that represents the differential data of the latest version in distribution road categories of each block in the distribution area from the differential data management database 18, because the version information in the navigation map information 38 stored in each navigation device 2 is managed in units of distribution road categories of high standard, ordinary and narrow street in the block (mesh) of an approximately 2.5 km square. Because it is possible for the map information distribution center 3, when the map information in the distribution road category of high standard, that relates to national expressways, city expressways, and national roads of single and double digit numbers, and the like in each block of the navigation map information 38 stored in the data recorder 22 of the navigation device 2 has already been updated to the latest version, to extract and transmit the differential data of bare minimum amount relating to updates of the distribution road categories of ordinary and narrow street to the navigation device 2 excluding the map information relating to the high standard. This makes it possible to reduce the amount of communication data with the navigation device 2.

Only a home flag, coordinate data and a navigation ID are needed to be transmitted as updating request data from the navigation device 2 to the map information distribution center 3 when the navigation device 2 requests differential data from the map information distribution center 3. This makes it possible to further reduce the amount of communication data transmitted for updating the navigation map information 38 in the navigation device 2.

The map information distribution center 3, when receiving the distribution ID that has been transmitted together with differential data and the navigation ID that specifies the navigation device 2, updates by reading out the distribution management information corresponding to the distribution ID from the distribution management information database 19 and renewing the version of the updating history data specified by the navigation ID stored in the updating history database 15 to the version corresponding to each block ID and distribution road category of the distribution management data. This makes it possible to accurately manage the updating history of version information in each distribution road category corresponding to each block ID of the navigation map information 3 8 stored in the data recorder 22 of the navigation device 2 and to accurately manage the version information in each distribution road category corresponding to each block ID of the navigation map information 38 currently stored in the navigation device 2.

As described in details above, in the map information distribution system 1 of the first example, when receiving the coordinate data and home flag together with the navigation ID that specifies the navigation device 2, the CPU 11 of the map information distribution center 3 sets the first area centered by the coordinate data of the registered home position as the distribution area while the home flag is ON, and sets the second area centered by the coordinate data of a destination as the distribution area while the home flag is OFF (S11 and S111). The CPU 11 extracts the differential data between the current version in the navigation device 2 and the latest version of each block of the distribution area, by reading out the data relating to the updating history of the distribution area in the navigation device 2 specified by the navigation ID from the navigation updating history information database 15, as well as the differential data file name that represents the differential data of the latest version of the blocks in the distribution area from the differential data management database 18 (S113). Next, the CPU 11 selects a distribution ID that identifies the differential data extracted, stores the distribution management information that includes the distribution ID and the differential data to the distribution management information database 19, and then transmits the distribution ID and the differential data to the navigation device 2 (S114 to S115).

Meanwhile, the CPU 41 in the navigation device 2, when the navigation map information 3 8 is updated based on the received differential data, transmits the received distribution ID and the navigation ID that identifies the aforementioned navigation device 2 to the map information distribution center 3 (S12 to S16). The CPU 11 in the map information distribution center 3, when receiving the distribution ID and the navigation ID, determines as the navigation map information 38 in the navigation device 2 has been updated, and updates the updating history data specified by the navigation ID stored in the updating history database 15 by reading out the distribution management information corresponding to the distribution ID from the distribution management information database 19 (S116 to S118).

When the navigation device 2 requests updating of map information, only a home flag that is set either ON or OFF, coordinate data and the navigation ID are needed to be transmitted from the navigation device 2 to the map information distribution center 3. This makes it possible to reduce the amount of communication data transmitted for updating the navigation map information 38 in the navigation device 2.

When receiving the distribution ID that has been transmitted together with differential data and the navigation ID that specifies the navigation device 2, the map information distribution center 3 updates updating history data specified by the navigation ID stored in the updating history database 15 by reading out the distribution management information corresponding to the distribution ID from the distribution management information database 19. This makes it possible to accurately manage the updating history of the navigation map information 38 stored in the data recorder 22 of the navigation device 2 and to accurately manage the version information of the navigation map information 38 currently stored in the navigation device 2.

Since it is possible for the map information distribution center 3 to accurately manage the updating history of navigation map information 38 stored in the data recorder 22 of the navigation device 2, when receiving a home flag, coordinate data and the navigation ID as updating request data from the navigation device 2, it is possible to extract the bare minimum amount of the differential data for updating the navigation map information 38 in the navigation device 2. This makes it possible to further reduce the amount of communication data transmitted for updating the navigation map information 38 in the navigation device 2.

The CPU 11 in the map information distribution center 3, when receiving prefecture data that represents prefectures and a prefectural unit requesting signal from the PC 5, sets the prefecture specified by the prefecture data as the distribution area, reads out the differential data management information of the latest version of each block in the distribution area by prefecture from the differential data management database 18, reads out each piece of the differential data from the updating map information 17 based on the read differential data management data, and stores them to the RAM 12 (S211 and S311). The CPU 11 selects a distribution ID that identifies the extracted differential data by prefecture, creates PC distribution management data, stores it to the distribution management information database 19 as distribution data management data to manage the differential data by prefecture to be distributed to the PC 5, and then transmits the distribution ID and the updating information that includes the differential data of the distribution area by prefecture to the PC 5 (S312 to S314). Meanwhile, the PC 5 records the distribution ID received and updating map information that includes the differential data of the distribution area by prefecture on to the CD-ROM 6 (S212 to S213).

Meanwhile, the CPU 41 in the navigation device 2 reads out the updating map information from the CD-ROM 6 via a reader 28, and when the navigation map information 38 is updated, notifies the update of navigation map information 38 by the CD-ROM 6 by reading out the distribution ID from the CD-ROM 6 and transmitting it together with the navigation ID that identifies the navigation device 2 to the map information distribution center 3 (S31 to S35). The CPU 11 in the map information distribution center 3, when receiving the distribution ID and navigation ID, reads out the PC distribution management information corresponding to the distribution ID from the distribution management information database 19. The CPU 11 updates by renewing the version of updating history data stored in the updating history database 15 specified by the navigation ID to the version corresponding to each of the block IDs and distribution road categories in the PC distribution management information (S411 to S413).

This makes it possible for the CPU 41 in the navigation device 2, by reading out the updating map information from the CD-ROM 6 via the reader 28 and updating the navigation map information 38 of the distribution area by prefecture, to update the navigation map information 38 of the distribution area by prefecture to the map information of the latest version.

The CPU 41 in the navigation device 2, when the navigation map information 38 of the distribution area by prefecture is updated by reading out the updating map information from the CD-ROM 6 via the reader 28, transmits the distribution ID read out from the CD-ROM 6 and the navigation ID that identifies the navigation device 2 to the map information distribution center 3. Accordingly, the map information distribution center 3 updates by renewing the version of updating history data specified by the navigation ID received to the version corresponding to each of the block IDs and distribution road categories of the PC distribution management information corresponding to the distribution ID received. This makes it possible for the map information distribution center 3, even when the CPU 41 in the navigation device 2 updates the navigation map information 38 via the CD-ROM 6, to accurately manage the updating history of the navigation map information 38 stored in the data recorder 22 in the navigation device 2, and to even more accurately manage the version information of the navigation map information 38 currently stored in the navigation device 2.

Since it is possible for the map information distribution center 3 to accurately manage the updating history of the navigation map information 38 stored in the navigation device 2, even when the CPU 41 in the navigation device 2 updates the navigation map information 38 via the CD-ROM 6, when receiving a home flag, coordinate data and navigation ID as updating request data from the navigation device 2, it is possible to accurately extract the bare minimum amount of the differential data for updating the navigation map information 38 in the navigation device 2. It makes it possible to further reduce the amount of communication data transmitted for updating the navigation map information 38 in the navigation device 2.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

The invention claimed is:

1. A map information distribution center, comprising:
a memory storing:
  map information including differential data for a plurality of versions for updating map information stored in a navigation device to a latest version; and
  version information for each road category of a plurality of road categories of the map information stored in a navigation device, the version information correlated with identification information identifying the navigation device, each road category specifying roads of a particular size; and
a controller specifically configured to:
  receive the identification information from the navigation device;
  obtain, based on the received identification information, the version information for each road category of the map information stored in the navigation device corresponding to the stored identification information;
  perform a separate comparison for each road category of the map information stored in the navigation device, in which the obtained version information for each road category is separately compared with the latest version of the map information;
  based on the separate comparisons, separately determine for each road category whether the obtained version information for each road category is the latest version;
  when the obtained version information for a particular one of the road categories is not the latest version, extract from the memory differential data for only that particular road category between the obtained version for that road particular category and the latest version for that particular road category, without extracting from the memory any differential data for any road category that is the latest version;
  transmit the extracted differential data to the navigation device corresponding to the received identification information;
  receive, from the navigation device to which the differential data was transmitted, updating completion information representing completion of map information updating; and
  update, upon receipt of the updating completion information, version information for each road category of the stored map information based on the differential data transmitted.

2. The map information distribution center according to claim 1, wherein the controller is specifically configured to:
  receive area updating request information that requests updating information for a predefined area of the map information together with the identification data;
  obtain, based on the received identification information, the version information for each road category within the predefined area; and
  perform a separate comparison for each road category of the map information within the predefined area, in which the version information for each road category in the predefined area is separately compared with the latest version of the map information;
  based on the separate comparisons, separately determine whether the obtained version information for each road category in the predefined area is the latest version;
  when the obtained version information for a particular road category in the predefined area is not the latest version, extract from the memory differential data for only that particular road category between the obtained version for that particular road category and the latest version.

3. The map information distribution center according to claim 1, wherein:
  the map information is divided into a mesh unit of a predetermined region,
  the version information is stored for each road category in the mesh unit, and
  the differential data is extracted in the mesh unit.

4. The map information distribution center according to claim 1, wherein the memory stores version information for a plurality of navigation devices.

5. The map information distribution center according to claim 1, wherein the road categories include at least three road categories.

6. A map information distribution method, comprising:
storing map information;
storing version information for each road category of a plurality of road categories of the map information stored in a navigation device, the version information correlated with identification information identifying the navigation device, each road category specifying roads of a particular size;
receiving the identification information from the navigation device;
obtaining, based on the received identification information, the version information for each road category of the map information stored in the navigation device corresponding to the stored identification information;
performing a separate comparison for each road category of the map information stored in the navigation device, in which the obtained version information for each road category is separately compared with the latest version of the map information;
based on the separate comparisons, separately determining for each road category whether the obtained version information for each road category is the latest version;
when the obtained version information for one of the particular road categories is not the latest version, extracting from the memory differential data for only that particular road category between the obtained version for that particular road category and the latest version, without extracting from the memory any differential data for any road category that is the latest version;
transmitting the extracted differential data to the navigation device corresponding to the received identification information;
receiving, from the navigation device to which the differential data was transmitted, updating completion information representing completion of map information updating; and
updating, upon receipt of the updating completion information, version information for each road category of the stored map information based on the differential data transmitted.

7. The map information distribution method according to claim 6, further comprising:
  receiving area updating request information that requests updating information for a predefined area of the map information together with the identification data;
  obtaining, based on the received identification information, the version information for each road category within the predefined area; and performing a separate comparison for each road category of the map information within the predefined area, in which the version information for each road category in the predefined area is separately compared with the latest version of the map information;

based on the separate comparisons, separately determining whether the obtained version information for each road category in the predefined area is the latest version;

when the obtained version information for a particular road category in the predefined area is not the latest version, extracting from the memory differential data for only that particular road category between the obtained version for that particular road category and the latest version.

8. The map information distribution method according to claim 6, wherein:

the map information is divided into a mesh unit of a predetermined region, the version information is stored for each road category in the mesh unit, and the differential data is extracted in the mesh unit.

9. The map information distribution method according to claim 6, further comprising storing version information for a plurality of navigation devices.

10. A map information distribution system, comprising:

a navigation device for updating stored map information based on received updating information, the navigation device comprising:

a navigation controller specifically configured to transmit updating request data that requests updating information for a predefined area of the stored map information and identification information identifying the navigation device to a map information distribution center; and the map information distribution center for distributing the updating information to the navigation device, the map information distribution center comprising:

a memory storing:

map information including differential data for a plurality of versions for updating map information stored in a navigation device to a latest version; and version information for each road category of a plurality of road categories of the map information stored in a navigation device, the version information correlated with identification information identifying the navigation device; and a center controller specifically configured to:

receive the identification information from the navigation device;

obtain, based on the received identification information, the version information of the map information in the predefined area stored in the navigation device corresponding to the stored identification information;

determine whether the obtained version information for each road category is the latest version;

when the obtained version information for a particular road category is not the latest version, extract from the memory differential data for that particular road category between the obtained version and the latest version, without extracting from the memory differential data for any road category that is the latest version; and transmit the extracted differential data and first distribution identification information identifying the differential data to the navigation device corresponding to the received identification information;

wherein the navigation controller is specifically configured to:

receive the differential data and the first distribution identification information;

update the map information of the predefined area based on the received differential data; and transmit, upon updating of the map information of the predefined area, the received first distribution identification information and the identification information to the map information distribution center; and wherein the center controller is specifically configured to:

receive the first distribution identification information and the identification information from the navigation device corresponding to the received identification information;

obtain, based on the received identification information, the version information of the map information stored in the navigation device corresponding to the stored identification information; and update, based on the received first distribution identification information, version information of the predefined area from the obtained version information.

11. The map information distribution system according to claim 10, further comprising the communication terminal, wherein the communication terminal comprises:

a recorder that records the map information of the received distribution area and the second distribution identification information in the storing medium.

12. The map information distribution system according to claim 10, wherein:

the navigation controller is specifically configured to:

set a destination;

set an ON/OFF condition of a coordinate flag;

when the coordinate flag is set as ON, transmit a coordinate flag set to ON and a coordinate position of a pre-registered updating spot as the updating request data; and when the coordinate flag is set as OFF, transmits a coordinate flag set to OFF and a coordinate position of the destination as the updating request data; and the center controller is specifically configured to:

when the coordinate flag set to ON and the coordinate position of the updating spot are received, select a first area centered by the coordinate position of the updating spot as the predefined area; and when the coordinate flag set to OFF and the coordinate position of the destination are received, select a second area centered by the coordinate position of the destination as the predefined area.

13. The map information distribution system according to claim 12, wherein the navigation controller is specifically configured to:

detect a vehicle status;

set the coordinate flag to on when the detected vehicle status is at engine start; and set the coordinate flag to OFF when the detected vehicle status is at destination setting.

14. The map information distribution system according to claim 10, wherein:

the navigation controller is specifically configured to:

read map information relating to a predefined distribution area and second distribution identification information identifying the map information from a storing medium storing the map information and the second distribution identification data;

update the map information of the distribution area based on the read map information; and upon updating of the map information of the distribution area, transmit the read second distribution identification information and the identification information to the map information distribution center; and the center controller is specifically configured to:

receive updating request data from a communication terminal for requesting updating information for the distribution area of the map data;

extract map information of a latest version of the distribution area from the memory;

transmit the extracted map information of the distribution area and second distribution identification information identifying the map information to the communication terminal;

receive the second distribution identification information and the identification data, based on the identification information received;

obtain, the version information of the map information stored in the navigation device corresponding to the identification information from the memory; and update, based on the received second distribution identification information, version information of the distribution area from the obtained version information.

15. A map information distribution method wherein a map information distribution center distributes, to a navigation device updating map information based on updating information received, the updating data, the method comprising:

transmitting from the navigation device to the map information distribution center an updating request data that requests updating information for a predefined area of the stored map information and identification information identifying the navigation device to a map information distribution center;

storing map information in the map information distribution center, the map information including differential data for a plurality of versions for updating map information stored in a navigation device to a latest version;

storing in the map information distribution center version information for each road category of a plurality of road categories of the map information stored in a navigation device, the version information correlated with identification information identifying the navigation device;

receiving in the map information distribution center the identification information from the navigation device;

obtaining, based on the received identification information, the version information of the map information in the predefined area stored in the navigation device corresponding to the stored identification information;

determining whether the obtained version information for each road category is the latest version;

when the obtained version information for a particular road category is not the latest version, extract from the memory differential data for that particular road category between the obtained version and the latest version, without extracting from the memory differential data for any road category that is the latest version;

transmitting the extracted differential data and first distribution identification information identifying the differential data from the map information distribution center to the navigation device corresponding to the received identification information;

receiving in the navigation device the differential data and the first distribution identification information;

updating the map information of the predefined area in the navigation device based on the received differential data;

transmitting, upon updating of the map information of the predefined area, the received first distribution identification information and the identification information to the map information distribution center;

receiving in the map information distribution center the first distribution identification information and the identification information from the navigation device corresponding to the received identification information;

obtaining, based on the received identification information, the version information of the map information stored in the navigation device corresponding to the stored identification information; and updating, based on the received first distribution identification information, version information of the predefined area in the map information distribution center from the obtained version information.

16. The map information distribution method according to claim 15, further comprising:

setting a destination;

setting an ON/OFF condition of a coordinate flag;

when the coordinate flag is set as ON, transmitting a coordinate flag set to ON and a coordinate position of a pre-registered updating spot as the updating request data from the navigation device to the map information distribution center; and when the coordinate flag is set as OFF, transmitting a coordinate flag set to OFF and a coordinate position of the destination as the updating request data from the navigation device to the map information distribution center;

when the coordinate flag set to ON and the coordinate position of the updating spot are received in the map information distribution center, selecting a first area centered by the coordinate position of the updating spot as the predefined area; and when the coordinate flag set to OFF and the coordinate position of the destination are received in the map information distribution center, selecting a second area centered by the coordinate position of the destination as the predefined area.

17. The map information distribution method according to claim 15, further comprising:

reading map information relating to a predefined distribution area and second distribution identification information identifying the map information from a storing medium storing the map information and the second distribution identification data;

updating the map information of the distribution area based on the read map information;

upon updating of the map information of the distribution area, transmitting the read second distribution identification information and the identification information from the navigation device to the map information distribution center;

receiving in the map information distribution center updating request data from a communication terminal for requesting updating information for the distribution area of the map data;

extracting map information of a latest version of the distribution area from the memory;

transmitting the extracted map information of the distribution area and second distribution identification information identifying the map information from the map information distribution center to the communication terminal;

receiving the second distribution identification information and the identification data, based on the identification information received;

obtaining, the version information of the map information stored in the navigation device corresponding to the identification information from the memory; and updating, based on the received second distribution identification information, version information of the distribution area in the memory of the map information distribution center from the obtained version information.

18. The map information distribution method according to claim 15, further comprising:

recording the map information of the received distribution area and the second distribution identification information in the storing medium.

* * * * *